(12) United States Patent     (10) Patent No.:   US 12,658,067 B2

Coppersmith, III     (45) Date of Patent:    Jun. 16, 2026

(54) METHODS AND SYSTEMS FOR A MULTI-USER SIMULATOR IMPLEMENTED VIA A SCENARIO EXERCISE PLATFORM

(71) Applicant: Smarter Reality, LLC, Round Rock, TX (US)

(72) Inventor: Walter Franklin Coppersmith, III, Round Rock, TX (US)

(73) Assignee: Smarter Reality, LLC, Round Rock, TX (US)

( * ) Notice: Subject to any disclaimer, the term of this patent is extended or adjusted under 35 U.S.C. 154(b) by 1206 days.

(21) Appl. No.: 17/242,804

(22) Filed: Apr. 28, 2021

(65) Prior Publication Data

US 2021/0343177 A1    Nov. 4, 2021

Related U.S. Application Data

(60) Provisional application No. 63/017,533, filed on Apr. 29, 2020.

(51) Int. Cl.

| | |
|---|---|
| *G09B 9/00* | (2006.01) |
| *G06N 5/02* | (2023.01) |
| *G06N 5/04* | (2023.01) |

(52) U.S. Cl.

CPC ............. *G09B 9/003* (2013.01); *G06N 5/027* (2013.01); *G06N 5/04* (2013.01)

(58) Field of Classification Search

CPC .......... G09B 9/003; G09B 9/00; G09B 19/00; G09B 19/22; G09B 7/00; G09B 5/00

See application file for complete search history.

(56) References Cited

U.S. PATENT DOCUMENTS

| | | | |
|---|---|---|---|
| 6,931,365 B1 * | 8/2005 | Mehta .................. | G06Q 10/067 703/1 |
| 11,071,901 B2 * | 7/2021 | Morton ................... | A63F 13/85 |
| 2005/0282141 A1 * | 12/2005 | Falash ...................... | G09B 7/00 434/219 |
| 2008/0108021 A1 * | 5/2008 | Slayton ................... | F41A 33/02 434/16 |
| 2011/0008758 A1 * | 1/2011 | Kortas ...................... | G09B 7/02 434/219 |
| 2021/0124597 A1 * | 4/2021 | Ramakrishnan ....... | G06N 20/00 |

* cited by examiner

*Primary Examiner* — Robert J Utama

(74) *Attorney, Agent, or Firm* — Dickinson Wright PLLC; Stephen A. Mason; Jonathan H. Harder

(57) ABSTRACT

A method for training users in remote locations is disclosed. The method provides a user interface, wherein the user interface presents scenarios and roles to play in the scenarios. The method receives selections, wherein the selections comprise a selection of a scenario and a role the user selects to play during the scenario. The method transmits, based on the selection of the scenario and the role the user selects to play during the scenario, prompts in a first turn to the computing devices, wherein each of the prompts is unique to the particular role of each of the plurality of users. The method receives, from the computing devices, actions to perform in response to the prompts, and modifies, based on the actions, the scenario for a subsequent turn to cause different prompts to be transmitted to the computing devices.

20 Claims, 29 Drawing Sheets

1400

Figure 15:
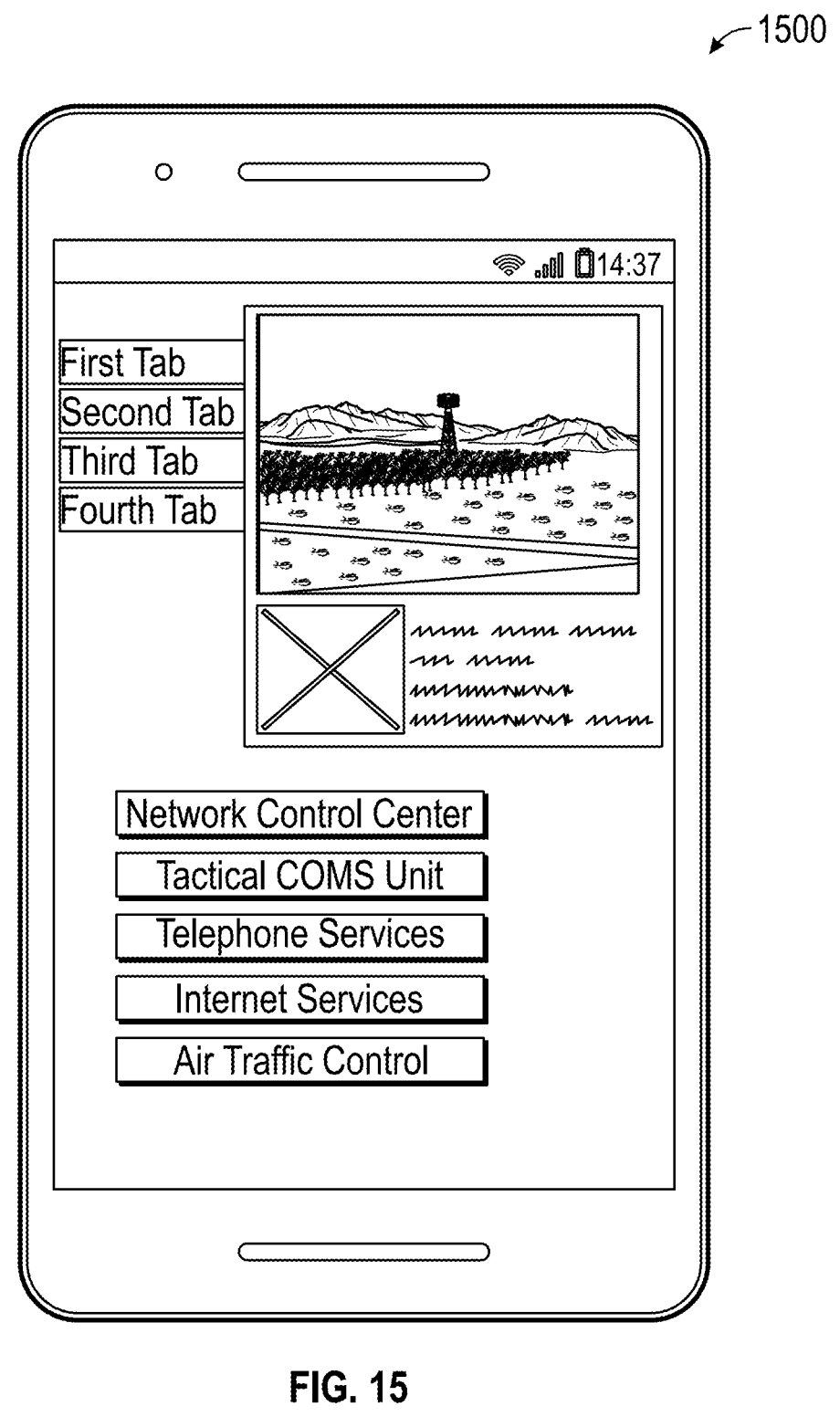

1500

First Tab
Second Tab
Third Tab
Fourth Tab

Network Control Center

Tactical COMS Unit

Telephone Services

Internet Services

Air Traffic Control

| Mission Packets | Select 1 Primary and 2 Secondary Targets | | | Primary | Target 3 | ⟩ | ⊞ | ✎ |

| Targeting | Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. |

Secondary 1 | Target 5 | ⟩ | ⊞ | ✎

Secondary 2 | *Select on aircraft* ⟩ | ⊞ | ✎

| Reporting |
| Aircraft Briefing |

≡ OPERATION KNOCKDOWN // A4M: A. PENN    TURN 3    ACTIONS 2/4  |  COMMIT ▷

▣ Airfield  |  Listing  |  Parking Map      14 Aircraft Available

| Aircraft | | | | | | | |
| --- | --- | --- | --- | --- | --- | --- | --- |
| Equipment | | | | | | | |
| Flying Unit | Tail # | MDS | MX Status | Grid Status | Parking Location | Last Update | Contam |
| 286FS | 94-2571 | F-15D | NMCA | Ground | 4682 | Clear | 05 Mar |
| 286FS | 94-8427 | F-15D | NMCA | Ground | 4705 | Clear | 05 Mar |
| 286FS | 94-6482 | F-15D | NMCA | Ground | 4708 | Clear | 05 Mar |
| 286FS | 94-7463 | F-15D | FMC | Ground | 4681 | Clear | 05 Mar |
| 286FS | 94-4677 | F-15D | FMC | Airborne | 4710 | Clear | 05 Mar |
| 286FS | 94-6917 | F-15D | NMCA | Ground | 4995 | Clear | 05 Mar |
| 286FS | 94-5799 | F-15D | FMC | Airborne | 4850 | Clear | 05 Mar |
| 286FS | 94-6348 | F-15D | FMC | Airborne | 4855 | Clear | 05 Mar |
| 286FS | 94-6244 | F-15D | NMCA | Airborne | 4725 | Clear | 05 Mar |
| 286FS | 94-524 | F-15D | FMC | Ground | 4761 | Clear | 05 Mar |

(Crew / Schedule)

OPERATION KNOCKDOWN // A4M: A. PENN     TURN 3   ACTIONS 2/4   COMMIT ▷

Show All

Show Mine

Event Log

| Timestamp | Description | Status |
|---|---|---|
| 15:05:34 | DRONE SIGHTED NEAR BASE! Grid: 34.02, 56.35. Source: Security. | ACKNOWLEDGED |
| 13:30:45 | Ut enim ad minima veniam, quis nostrum exercitationem ullam corporis suscipi | |
| 12:47:14 | Ut enim ad minima veniam, quis nostrum exercitationem ullam corporis suscipi | |
| 10:32:40 | Ut enim ad minima veniam, quis nostrum exercitationem ullam corporis suscipi | FORWARDED |
| 08:45:00 | Ut enim ad minima veniam, quis nostrum exercitationem ullam corporis suscipi | CLEARED |
| 06:45:24 | Ut enim ad minima veniam, quis nostrum exercitationem ullam corporis suscipi | |
| 03:30:15 | Ut enim ad minima veniam, quis nostrum exercitationem ullam corporis suscipi | CLEARED |

Figure 25A:
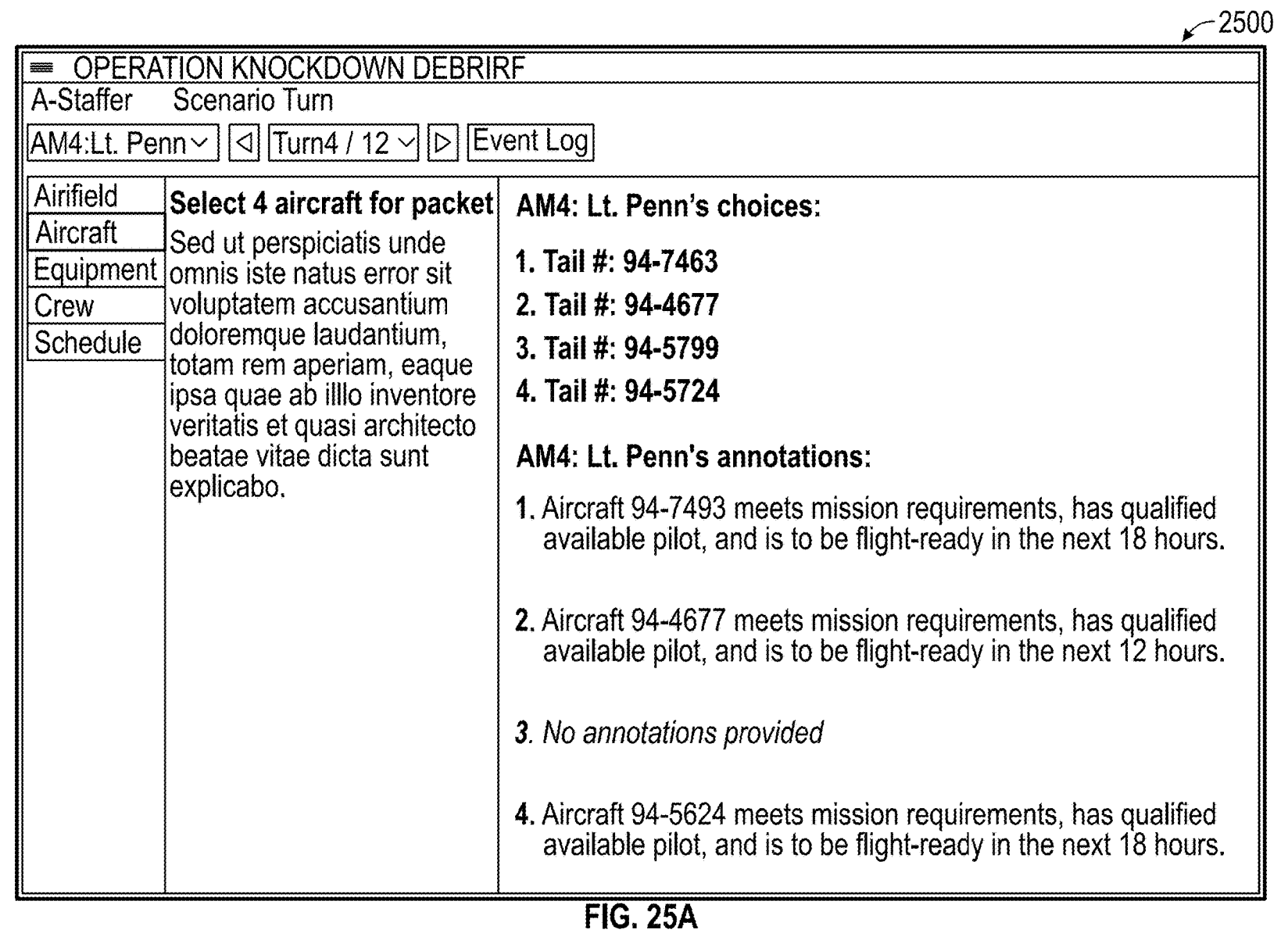

≡ OPERATION KNOCKDOWN DEBRIRF

A-Staffer    Scenario Turn

AM4:Lt. Penn ∨    ◁    Turn4 / 12 ∨    △    Event Log

| Airfield |
| Aircraft |
| Equipment |
| Crew |
| Schedule |

Select 4 aircraft for packet

Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo.

AM4: Lt. Penn's choices:

1. Tail #: 94-7463

2. Tail #: 94-4677

3. Tail #: 94-5799

4. Tail #: 94-5724

AM4: Lt. Penn's annotations:

1. Aircraft 94-7493 meets mission requirements, has qualified available pilot, and is to be flight-ready in the next 18 hours.

2. Aircraft 94-4677 meets mission requirements, has qualified available pilot, and is to be flight-ready in the next 12 hours.

3. *No annotations provided*

4. Aircraft 94-5624 meets mission requirements, has qualified available pilot, and is to be flight-ready in the next 18 hours.

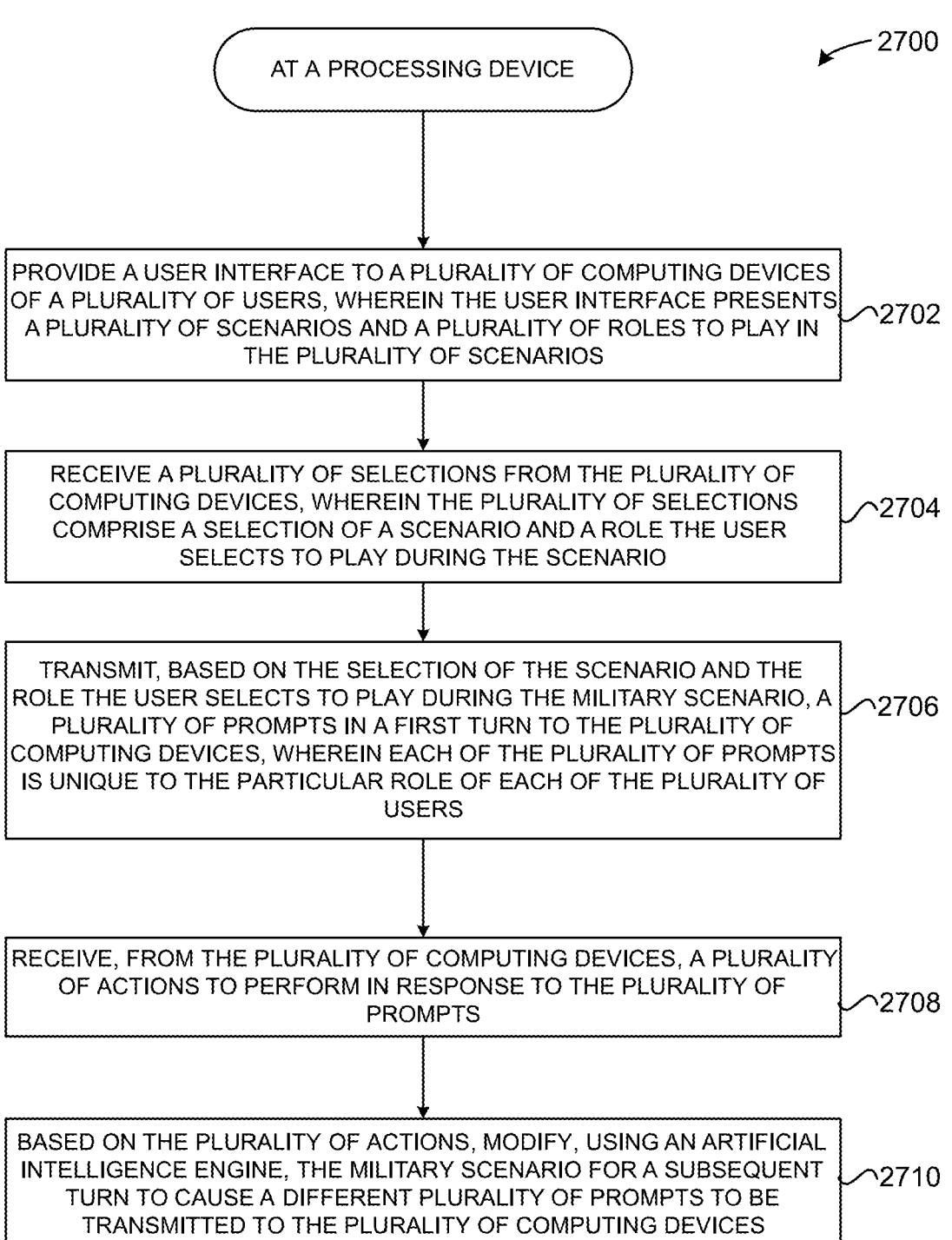

AT A PROCESSING DEVICE

2700

PROVIDE A USER INTERFACE TO A PLURALITY OF COMPUTING DEVICES OF A PLURALITY OF USERS, WHEREIN THE USER INTERFACE PRESENTS A PLURALITY OF SCENARIOS AND A PLURALITY OF ROLES TO PLAY IN THE PLURALITY OF SCENARIOS

2702

RECEIVE A PLURALITY OF SELECTIONS FROM THE PLURALITY OF COMPUTING DEVICES, WHEREIN THE PLURALITY OF SELECTIONS COMPRISE A SELECTION OF A SCENARIO AND A ROLE THE USER SELECTS TO PLAY DURING THE SCENARIO

2704

TRANSMIT, BASED ON THE SELECTION OF THE SCENARIO AND THE ROLE THE USER SELECTS TO PLAY DURING THE MILITARY SCENARIO, A PLURALITY OF PROMPTS IN A FIRST TURN TO THE PLURALITY OF COMPUTING DEVICES, WHEREIN EACH OF THE PLURALITY OF PROMPTS IS UNIQUE TO THE PARTICULAR ROLE OF EACH OF THE PLURALITY OF USERS

2706

RECEIVE, FROM THE PLURALITY OF COMPUTING DEVICES, A PLURALITY OF ACTIONS TO PERFORM IN RESPONSE TO THE PLURALITY OF PROMPTS

2708

BASED ON THE PLURALITY OF ACTIONS, MODIFY, USING AN ARTIFICIAL INTELLIGENCE ENGINE, THE MILITARY SCENARIO FOR A SUBSEQUENT TURN TO CAUSE A DIFFERENT PLURALITY OF PROMPTS TO BE TRANSMITTED TO THE PLURALITY OF COMPUTING DEVICES

METHODS AND SYSTEMS FOR A MULTI-USER SIMULATOR IMPLEMENTED VIA A SCENARIO EXERCISE PLATFORM

CROSS-REFERENCES TO RELATED APPLICATIONS

This application claims priority to and the benefit of U.S. Provisional Application Patent Ser. No. 63/017,533 filed Apr. 29, 2020, the entire disclosure of which is hereby incorporated by reference.

TECHNICAL FIELD

This disclosure relates to simulation. More specifically, this disclosure relates to a system and method for a multi-user simulator implemented via a scenario exercise platform.

BACKGROUND

Military organizations include chains of command. New recruits are often trained by more senior personnel for particular tasks. Units, individuals, and commanders may rotate through the military organizations frequently, and it may be desirable for high-speed connections with headquarters and on-the-job training to maintain operations. Further, civilian scenarios may require crisis management training to maintain peace and order.

SUMMARY

Representative embodiments set forth herein disclose various techniques for enabling a scenario exercise platform including a simulator.

In one embodiment, a method for training a plurality of users in remote locations is disclosed. The method includes providing a user interface to a plurality of computing devices of the plurality of users, wherein the user interface presents a plurality of scenarios and a plurality of roles to play in the plurality of scenarios. The method also includes receiving a plurality of selections from the plurality of computing devices, wherein the plurality of selections comprise a selection of a scenario and a role the user selects to play during the scenario. The method also includes transmitting, based on the selection of the scenario and the role the user selects to play during the scenario, a plurality of prompts in a first turn to the plurality of computing devices, wherein each of the plurality of prompts is unique to the particular role of each of the plurality of users. The method also includes receiving, from the plurality of computing devices, a plurality of actions to perform in response to the plurality of prompts, and based on the plurality of actions, modifying, using an artificial intelligence engine, the scenario for a subsequent turn to cause a different plurality of prompts to be transmitted to the plurality of computing devices.

In some embodiments, a tangible, non-transitory computer-readable medium stores instructions that, when executed, cause a processing device to perform any of the methods disclosed herein.

In some embodiments, a system includes a memory device storing instructions and a processing device communicatively coupled to the memory device. The processing device executes the instructions to perform any of the methods disclosed herein.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which:

FIG. 15 illustrates an example user interface of the scenario exercise platform executing on a mobile device according to certain embodiments of this disclosure;

FIG. 18 illustrates an example user interface presenting targets and aircraft involved in a military scenario according to certain embodiments of this disclosure;

3

Figure 19:
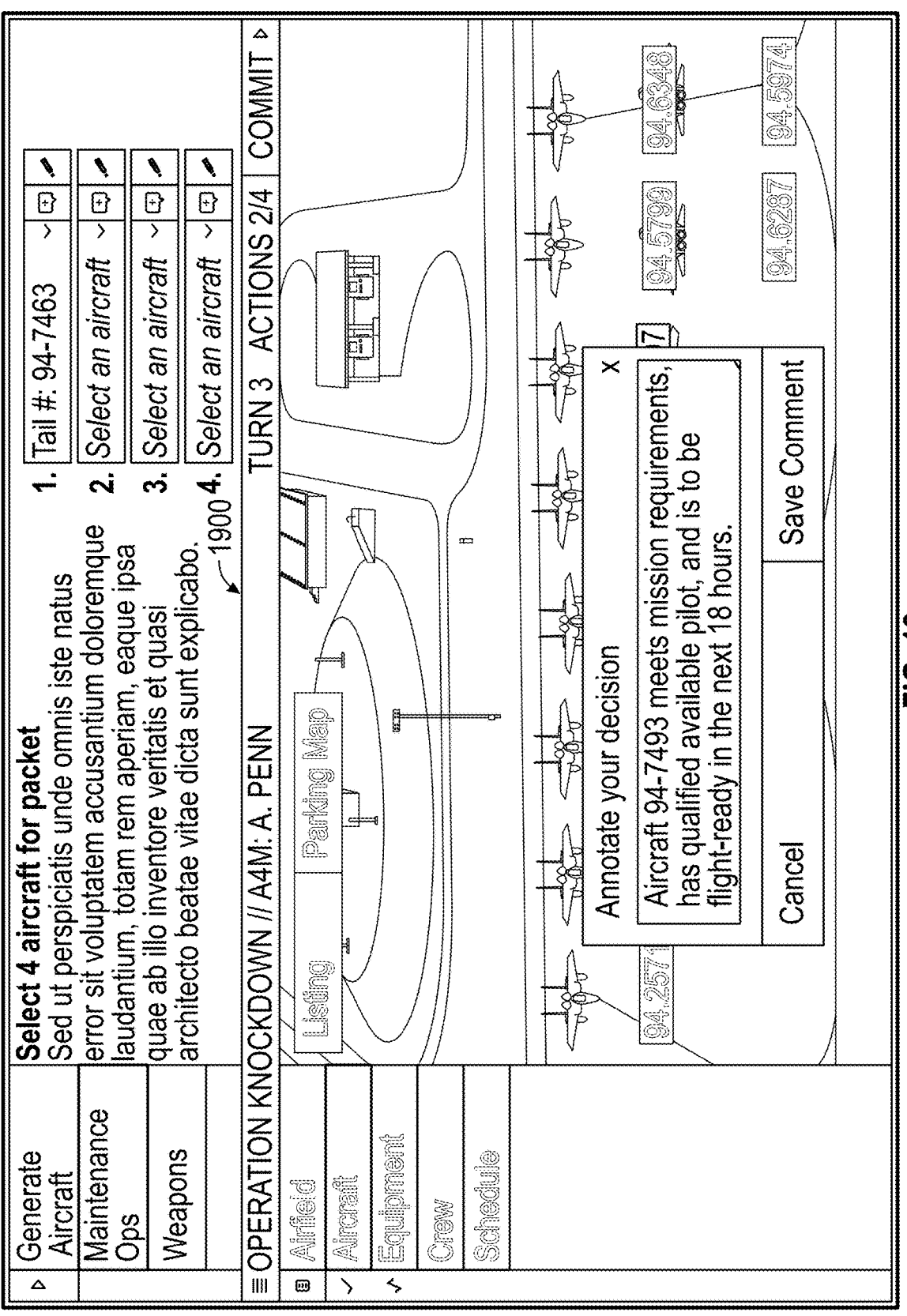
Figure 20:
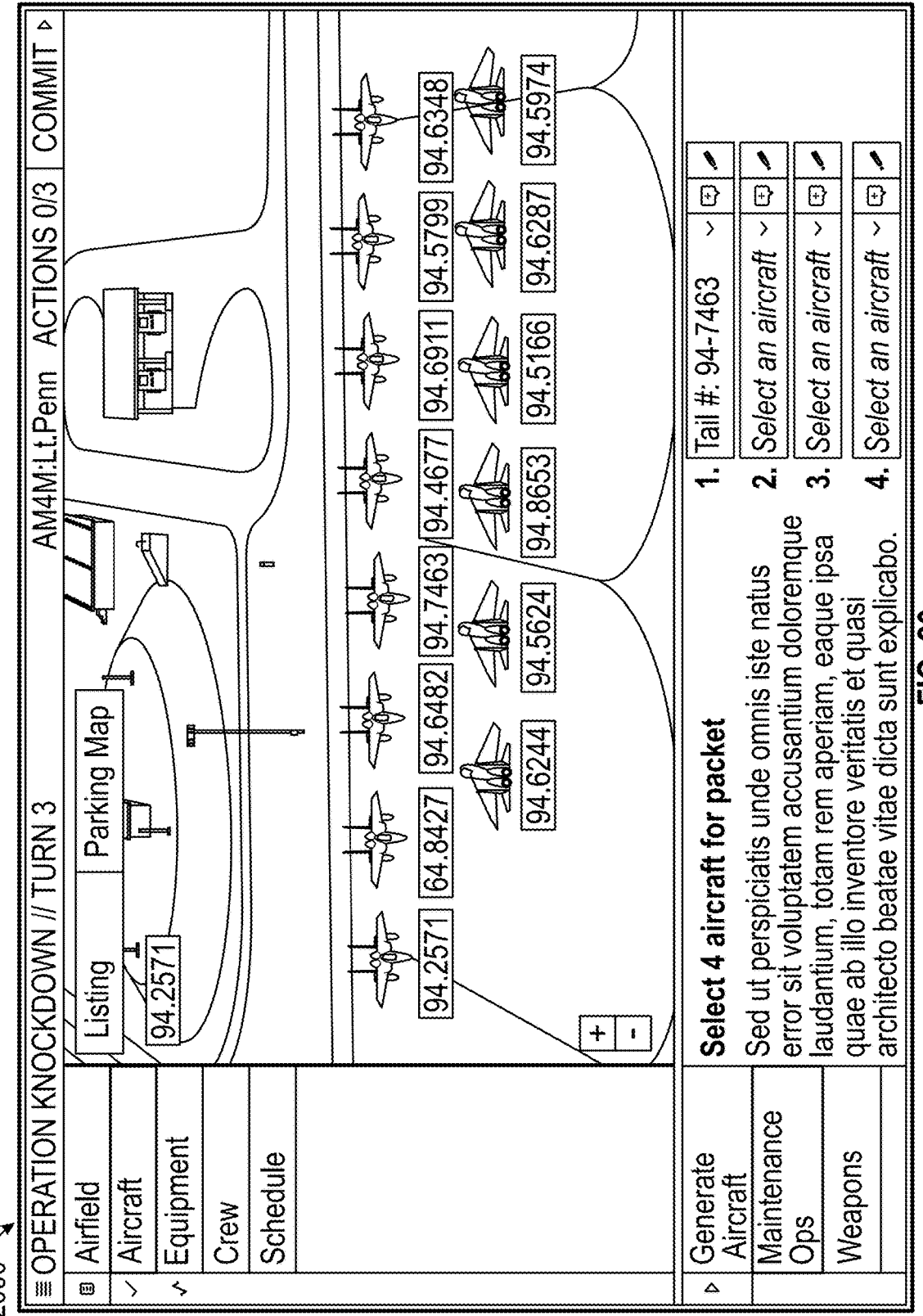
Figure 21:
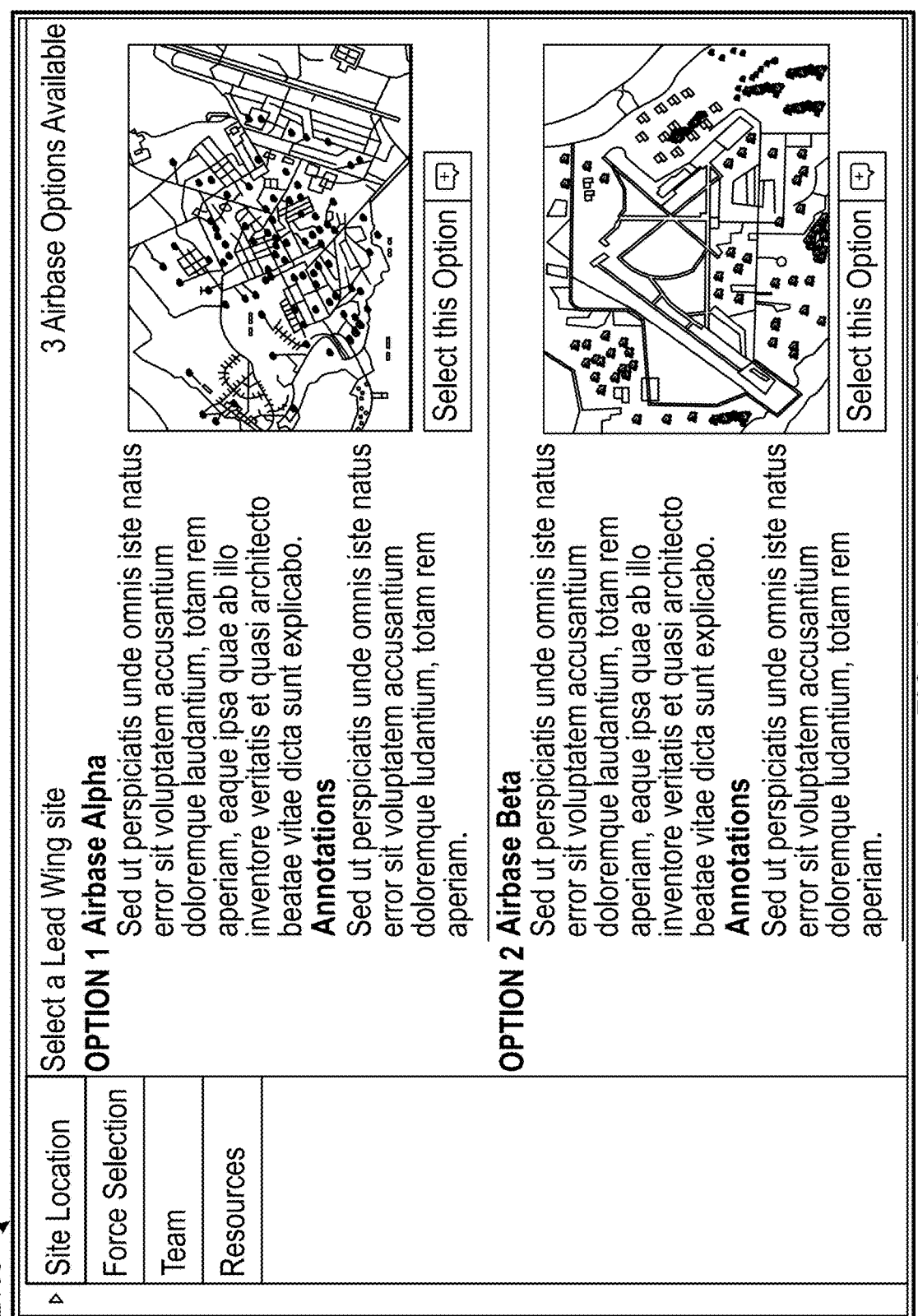
Figure 23:
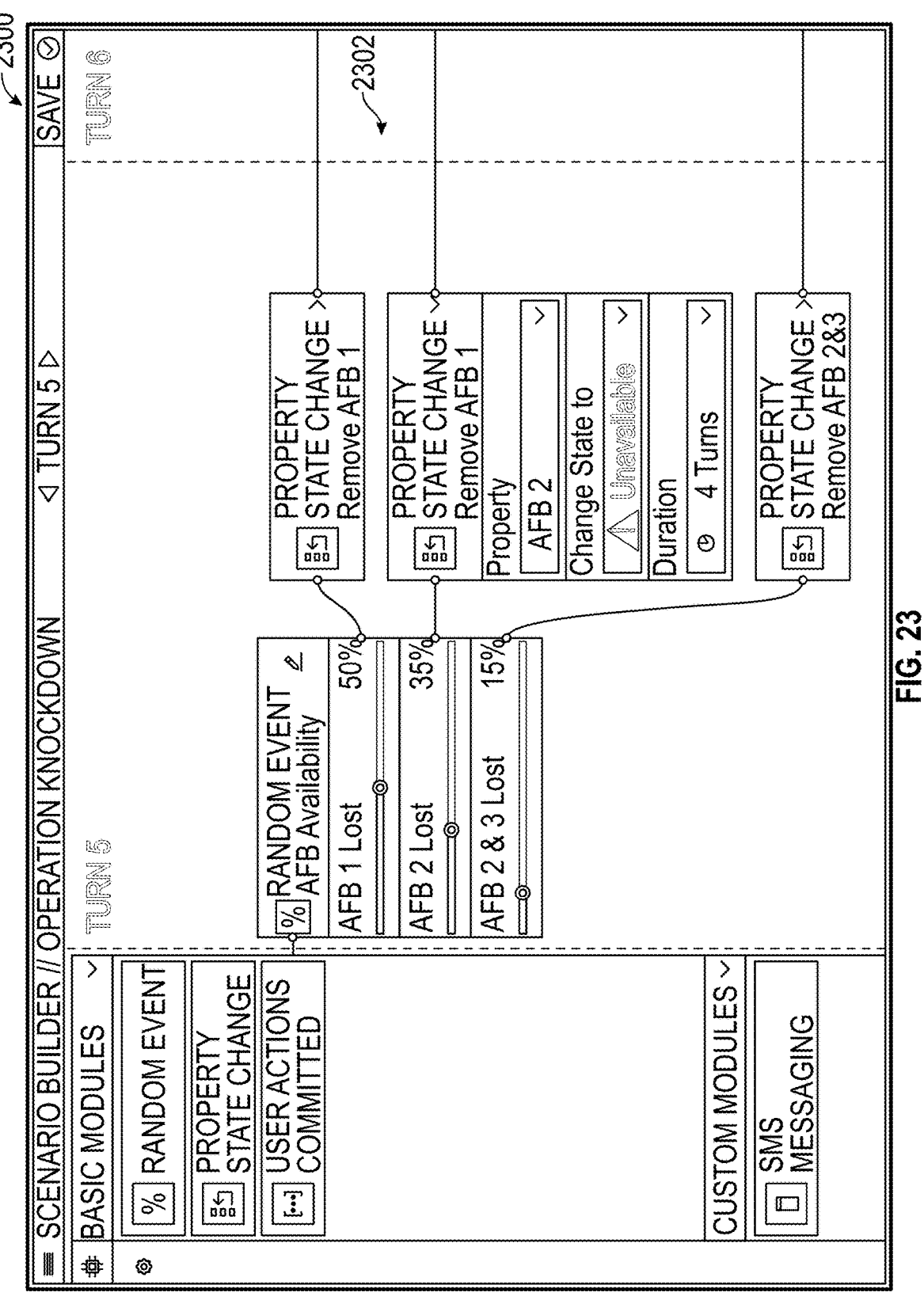
Figure 24:
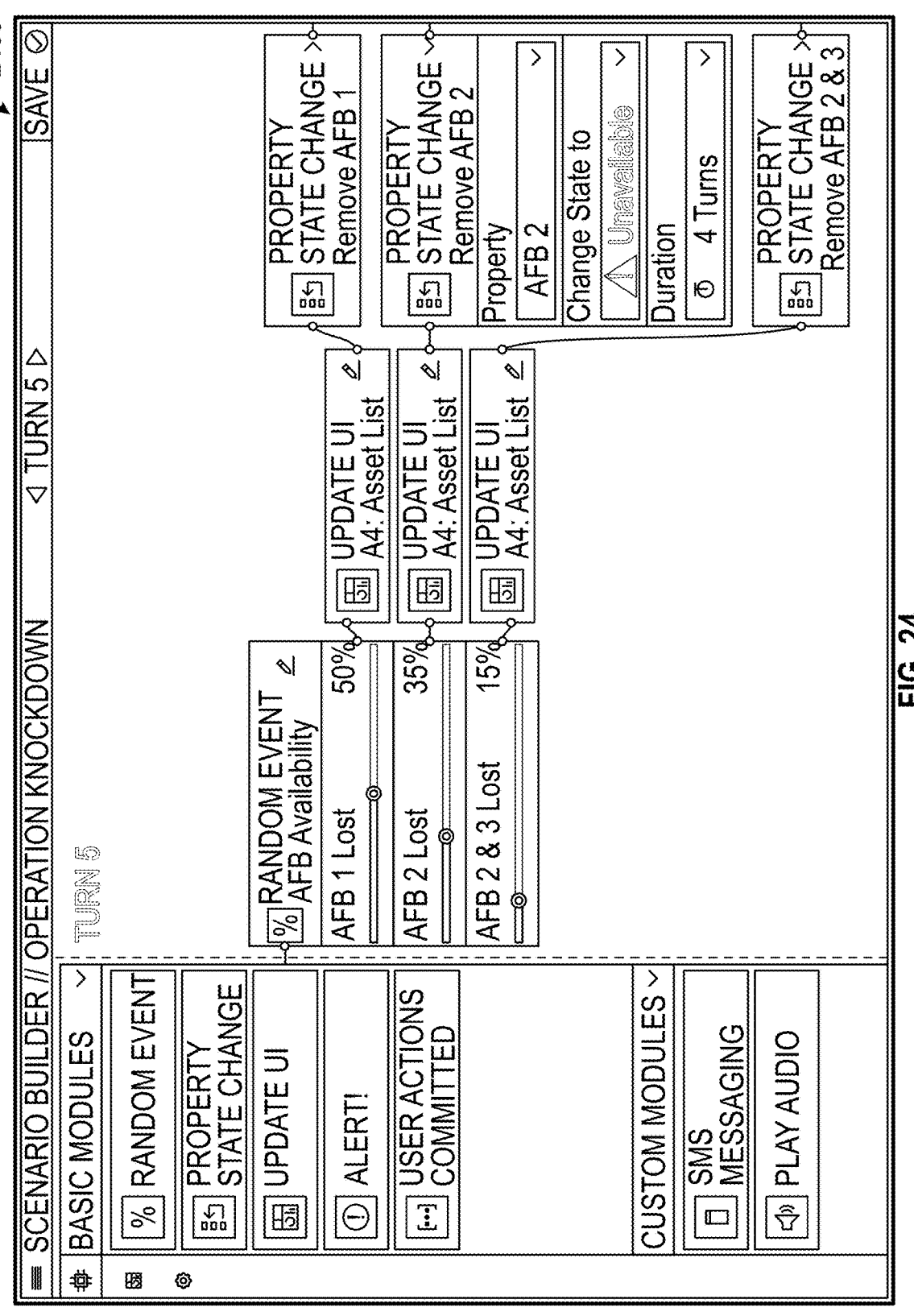
Figure 25B:
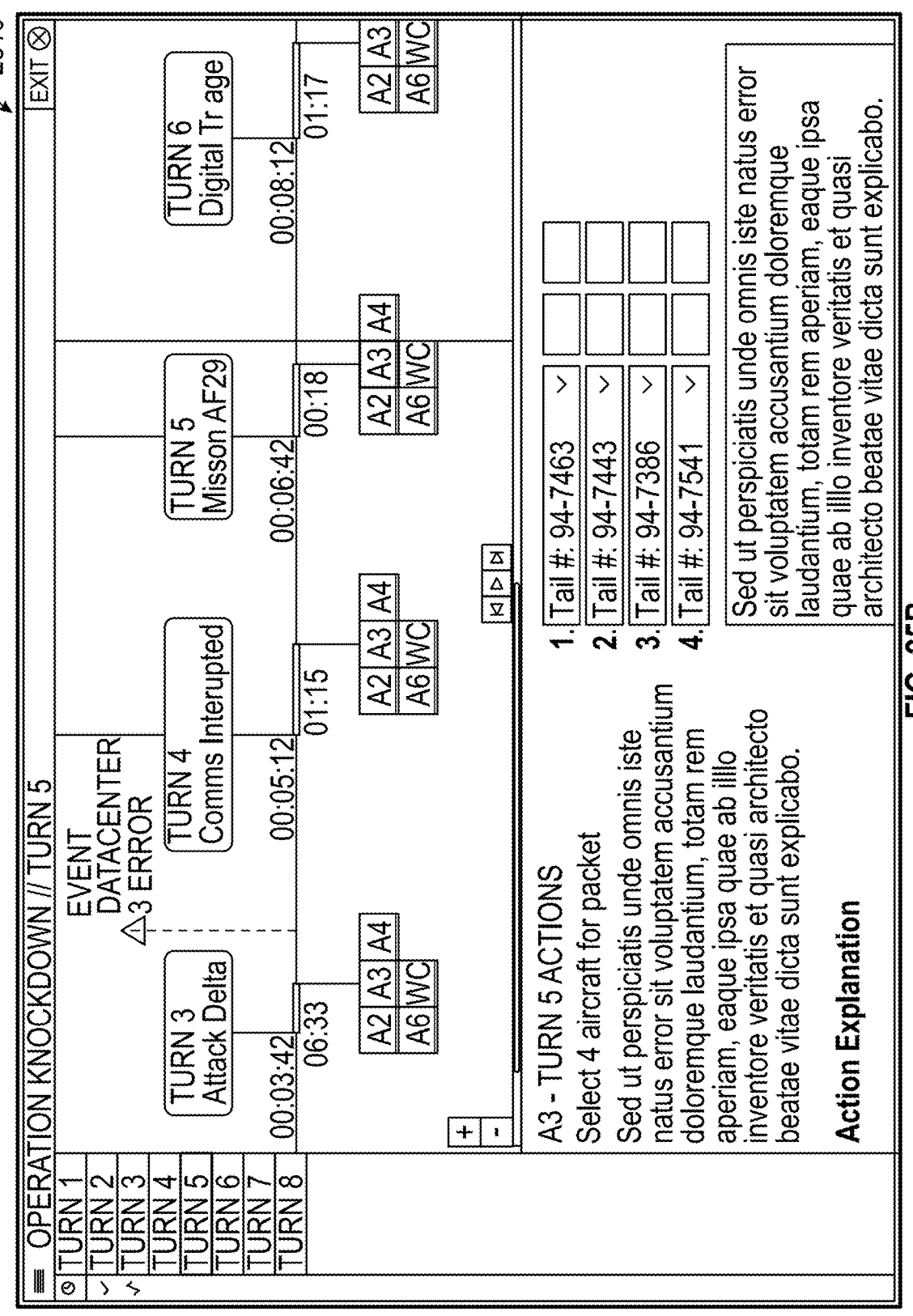
Figure 26:
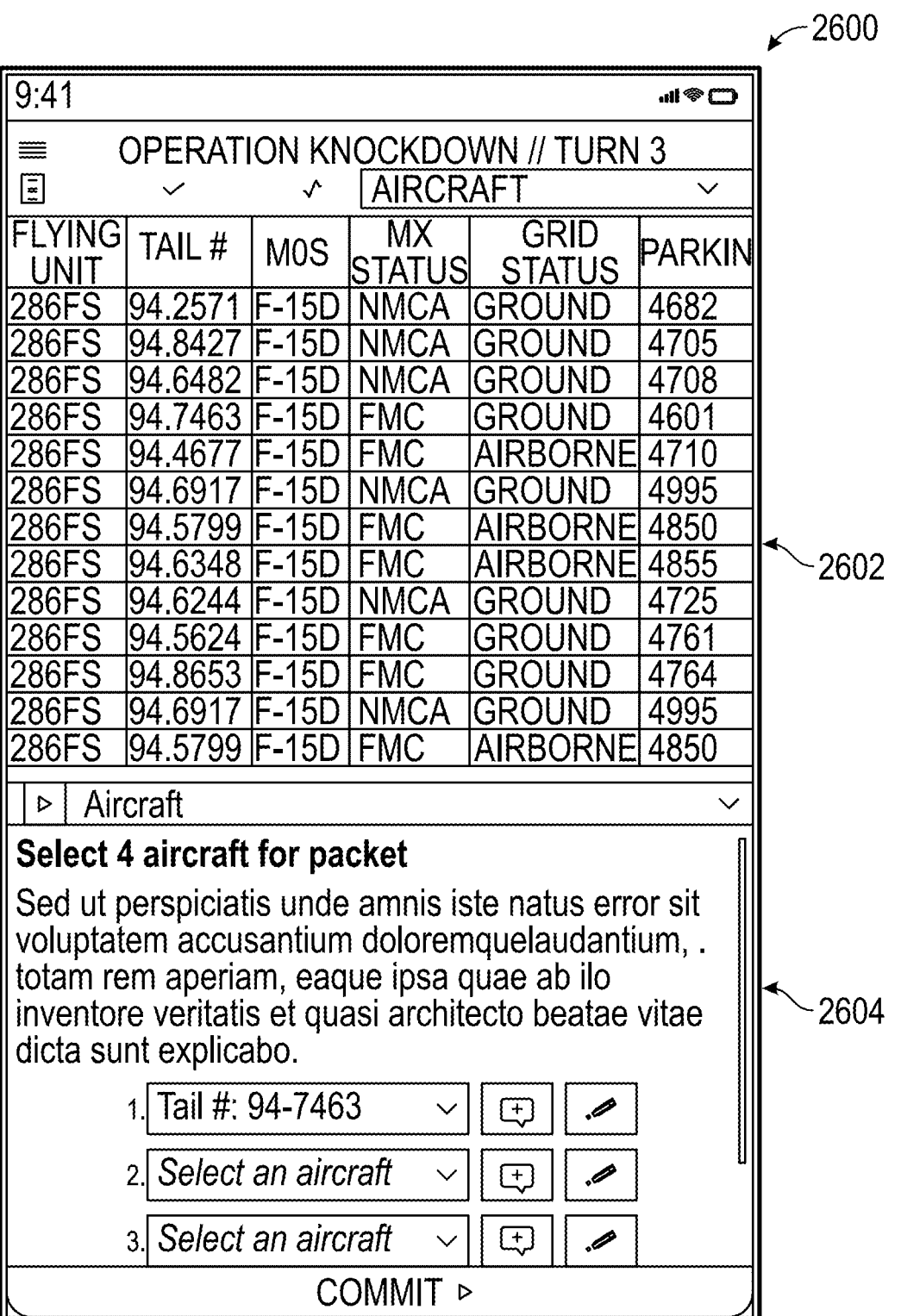
Figure 28:
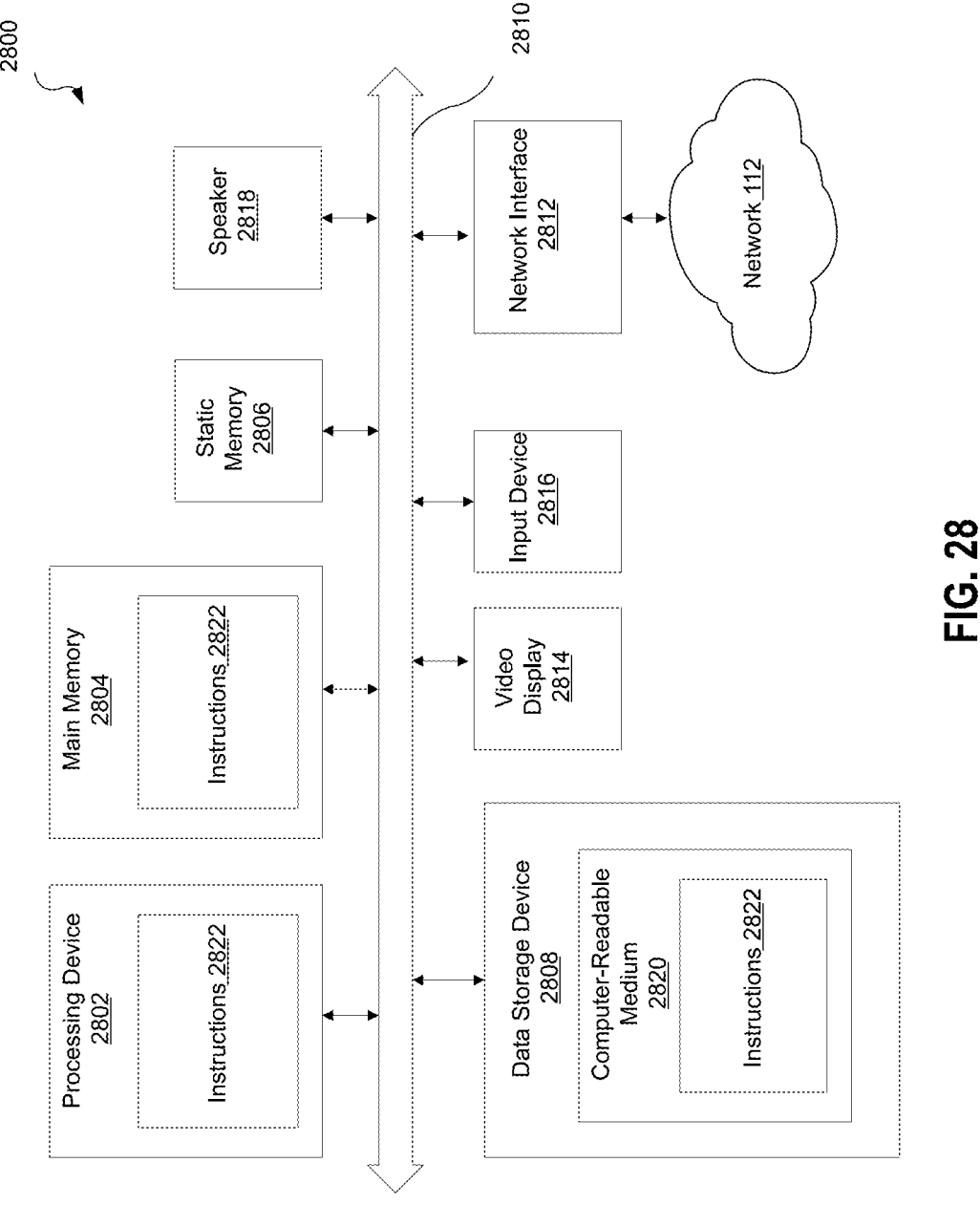

FIG. 19 illustrates an example user interface presenting aircraft and annotations for a decision involved in a military scenario according to certain embodiments of this disclosure;

FIG. 20 illustrates an example user interface presenting an aircraft selection and generation screen according to certain embodiments of this disclosure;

FIG. 21 illustrates an example user interface presenting a site location selection screen according to certain embodiments of this disclosure;

FIG. 22 illustrates an example user interface presenting an event log screen according to certain embodiments of this disclosure;

FIG. 23 illustrates an example user interface presenting a scenario builder screen according to certain embodiments of this disclosure;

FIG. 24 illustrates another example user interface presenting a scenario builder screen according to certain embodiments of this disclosure;

FIG. 25A illustrates an example user interface for a scenario review screen according to certain embodiments of this disclosure;

FIG. 25B illustrates an example user interface for an evaluation system screen according to certain embodiments of this disclosure;

FIG. 26 illustrates an example user interface including various portions of information pertaining to a user's turn that is conveniently presented on a screen of a mobile device according to certain embodiments of this disclosure;

FIG. 27 illustrates example operations of a method for training users in remote locations according to certain embodiments of this disclosure;

FIG. 28 illustrates an example computer system.

NOTATION AND NOMENCLATURE

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

Although the following description focuses mainly on military scenarios, it should be noted that civilian scenarios are also included in the scope of this disclosure. For example, civilian scenarios such as crisis response, emergency management and preparation, etc. may be simulated using the disclosed scenario exercise platform. Many professions, such as police officers, security guards, teachers, managers, and the like may benefit from the simulated crisis management, emergency management and preparation, etc. scenarios.

Certain circumstances render it difficult to perform training exercises in person for military organizations. For example, an outbreak of an infectious disease may cause military personnel to shelter-in-place, thereby preventing the military personnel from gathering in a common area to perform training (e.g., military scenarios). Other circumstances, such as living in disparate parts of a country, may hinder the ability for military personnel to gather and perform drills, training, and/or scenarios. These circumstances present a technical problem, which is enabling the training to occur while military personnel are not located in the same area (e.g., room, building, etc.).

Peer-level adversaries may generate fast-paced, highly contested environments that restrict communications, limiting command and control and on-the-job training. However, A-staff (e.g., air staff located at a base and/or at headquarters) needs to be able to perform as a team under austere and cyber-degraded command and control conditions. Further, conventional simulators may focus solely on muscle memory, while ignoring other important aspects of training for certain scenarios.

Accordingly, the disclosed embodiments relate to solving that technical problem by providing a technical solution. The technical solution pertains to a scenario exercise platform including a simulator that enables multiple people having differing roles to simultaneously train using various military and/or civilian scenarios. The scenario exercise platform may be implemented in computer instructions and may be provided by a cloud-based computing system as a downloadable application and/or as a website rendered in a web browser running on computing devices of the personnel participating in the scenario. The scenario exercise platform may train teams to operate in difficult environments that exhibit contested and degraded conditions found in peer-competitor conflict. Civilian example scenarios may include crisis response. The scenario exercise platform may generate and simulate scenarios that encourage communication, team-decision making, and effective risk-taking.

The scenario exercise platform may provide a virtual shared session in which multiple computing devices may be exchanged over a network (e.g., wide area network, local area network, etc.). In some embodiments, the computing devices may be physically located in separate buildings or geographic locations. In some embodiments, some or all of the computing devices may be located in the same room or geographic location. For example, a "crisis action team" is comprised of representatives of key members of organizational leadership (operations, logistics, legal, finance, etc.) gathered to be a single point of decision-making under emergency circumstances. In some organizations, there may be a special room filled with computers and teleconferencing equipment and the crisis action team is staffed. In some instances, when it is not possible to be in person in the room, the crisis action team may be remote.

Based on the role of each user using the scenario exercise platform, different user interfaces may be provided in real-time or near real-time to the various computing devices as a result of one user performing an operation during a turn of a scenario. "Real-time" may refer to an action occurring in less than 2 seconds, and "near real-time" may refer to an action occurring within 2-10 seconds. In such a way, each user is engaged in the same scenario but may be provided unique experiences based on their role in a scenario. User's may switch roles in a subsequent iteration of the scenario to understand how each of the different roles experience the scenario. Thus, the scenario exercise platform may provide a robust training and educational tool that provides the user with an enhanced user interface that may improve the user's experience using the computing device. Further, the scenario exercise platform solves the technical problem of enabling users that are remote from each other the ability to communicate information and interact in a scenario via a network of computing devices.

Further, the user interfaces provided by the scenario exercise platform may be beneficial for small screens like those of smart phones or tablets. The user interfaces may arrange information such that it is easily understandable on the small screens and easy to navigate on the small screens. Due to the turn-based nature of each scenario, the user interface may present just the information pertaining to a role of a user for the user's turn in the scenario, thereby not overwhelming the user with too much information on the user interface. The user may select their choices for the turn by selecting graphical elements on the user interface and select another graphical element to submit their choices. The user interfaces are designed such that they may improve the user's experience using the computing devices and provide a technical improvement.

The scenario exercise platform may provide combatant commanders with an operational combat wing that includes command and control elements integrated into existing combatant commanders command and control architectures. The disclosed embodiments may enable conducting air operations from austere locations with cyber-degraded command and control by transforming installation leadership into an air operations center "lite" that supplies the deployed A-staff with functions pertaining to intelligence, operations, logistics, and/or communications. The disclosed techniques may enable expeditionary air operations through military scenario training.

The scenario exercise platform is a cooperative, multi-participant computer-based simulation software that permits a commander and his/her A-staff to work together in advance of a real-world situation to collaboratively solve virtual challenges that replicate the expected environment. The scenario exercise platform provides a low-cost, easy-to-use tool for training of the A-staff. The scenario exercise platform may also permit the teams developing the training to explore different configurations, training, and staffing choices to inform doctrine. The scenario exercise platform may enable evaluating an organization's protocol or doctrine (e.g., plans to manage certain emergencies, events, etc.) by performing virtual scenario simulations without having to do real exercises. Further, the scenario exercise platform may determine, based on the actions and inputs from the users of the scenario, how the protocol or doctrine should be improved. The scenario exercise platform may provide recommendations for improvements, such as additional staffing, allocation of resources, etc. Accordingly, the scenario exercise platform may provide a data-driven approach to improving an organization's protocol or doctrine.

The scenario exercise platform may provide various teaching benefits, such as 1) unique roles that support 100% participation, 2) turn-based mechanics that emphasize decision impact and responding to changing circumstances, and 3) post simulation evaluations encouraging replay where different decisions lead to different outcomes. The scenario exercise platform enables users to create scenarios and exchange them in an integrated library which is valuable for "just in time" training. Virtual classroom technology is rapidly evolving and the scenario exercise platform provides additional benefits such as gamification by scoring the actions taken by users and the outcome of the scenarios, enabling cooperative scenario-play, and enabling users to use their own computing devices.

The scenario exercise platform may also aid siloed staff members in understanding the impacts of different choices making them multifunctional, strategic decision-makers in the absence of commander guidance (e.g., in cyber-degraded operations where communication is not possible). The scenario exercise platform enables A-staff to rehearse missions in a contested environment without the cost and risk of live exercises.

The scenario exercise platform may include an artificial intelligence (AI) enabled simulator, easy-to-use scenario creator, scenario library to permit teams to share scenarios, and/or an evaluation system. The scenario exercise platform may be used to train personnel, validate staff competency, plan missions, and/or test military program doctrine. Use of the scenario exercise platform may provide the benefit of developing an expeditionary force that can establish and defend new bases, receive follow-on forces, establish command and control, and fight from these new bases, even while under attack. The scenario exercise platform provides a training tool and simulator to prepare and/or certify A-staff and to practice certain military protocols or doctrines.

The simulator may use AI and includes an interface that allows participants to select a unique role (such as A2—Intelligence; A3—Operations; A4—Logistics, Engineering and Force Protection; etc.) and perform scenarios to practice missions including bed down, maneuver, offensive and defensive ops, mission generation, planning, aircraft recovery, base operations, airfield operations, force protection, and/or force logistics. The scenarios are executed by the simulator using AI (e.g., expert system, one or more machine learning models, or the like). In some embodiments, the AI performs the instructions provided by the scenario creator and adjusts outcomes based on participant choices. The AI may be transparent and flexible, meaning the author know what choices were presented to participants, sees responses via a user interface on a computing device in real-time or near real-time, and can adjust future training.

The scenario exercise platform enables A-staff to use a computing device to login using their credentials. Multiple A-staff personnel may access the scenario exercise platform using their computers in a shared session. The A-staff personnel may be in disparate locations and the scenario exercise platform may enable distributed learning. The A-staff each select a role, such as A2, A3, A4, A6, or the commander. Each role has a unique user interface with role-specific information, decisions, and actions. The user interfaces may be presented in time-synchronized fashion for each user during each turn based on one or more of the actions selected by the various roles of users in the previous turn. The users or instructor select a military scenario from multiple options and all participants will experience the same scenario at the same time. The military scenario begins with the users receiving a "road to war" brief that sets out conditions and desired outcomes. Once the briefing completes, the users receive inputs, communicate with each other, make decisions with limited information and resources, and act. The military scenario proceeds through rounds or turns with the actions of each user impacting the options/outcomes in subsequent rounds or turns. The military scenario continues until the end state and concludes with an out brief and/or evaluation.

Several features of the scenario exercise platform may include (1) flexible scenarios based on real-world conditions that can be experienced in about a relatively short amount of time (e.g., an hour) though covering days of simulated time, (2) team-based, cooperative activities (multiple participants working through the same scenario together as team simultaneously) that encourage A-staff wide communication and problem-solving, (3) realistic adversary and allied resource and unit movement, force generation and mission schedules, (4) contested environment options (cyber effects that degrade command and control; realistic fog of war on execution of command and control intent or orders), (5) enhanced computer user interface that establishes a common operating picture, (6) unique inputs, conditions and options for each A-staff participant related to their function, (7) post-simulation evaluation tools to enhance learning, (8) a scenario-creator tool permitting fast, iterative development of experiences and real-world situations, and (9) a "library" to permit users to share and customize user-created scenarios with other users.

The user interfaces that are tailored for each role and include role-specific information (e.g., checklists and/or documentation) and decisions may provide an enhanced user interface to the various users because they just see the information relevant for their role and not information relevant for other roles. Further, the user may not have to perform a query to find the information relevant for their role, thereby saving computing resources. The enhanced user interface may enhance a user's experience using the computing device, thereby encouraging the user to reuse the computing device and providing a technical benefit.

The scenario exercise platform may support no notice/short notice training. Further, the scenario exercise platform may provide training when the training is needed for a future operation (e.g., just in time training). The training (military scenarios) may be customized to the user (e.g., different scenarios can task different A-staff member roles differently). The scenario exercise platform may be accessible via a desktop computer, laptop computer, tablet computer, mobile device, or the like simultaneously. The scenario exercise platform may live feed of real-time data to enable training like the military personnel are fighting during military operations. The military scenarios that are created, using the enhanced UI, may be uploaded to an application store to enable other authorized users (military personnel) to download the military scenarios. There are various tiers of training supported by the scenario exercise platform. The tiers include operations, strategy, communications, logistics, commanders, and national command authority. The tiers may refer to different "perspectives" that users are able to select to focus on different levels from tactics, to operations, to national strategy, etc. Any type of case of "case study" style learning can be converted into an interactive, participatory, team-based experience simulated in a scenario via the scenario exercise platform.

The scenario creator tool may enable an instructor or user to create scenarios easily by selecting events, placing them on a timeline, and sharing them (e.g., via a shared library) with others for immediate use, ensuring "just in time" training "at the speed of relevance." In some embodiments, the scenarios may be stored in a library on a database. The library allows users to post, share, and download scenarios created by other authorized users. For example, if an A-staff creates a custom scenario and loads it to the library, other authorized users can access and review the scenario, use it as written, or modify it for their own purposes.

The scenario exercise platform may replicate the expected operating environment of a military scenario. A commander may be deployed to a location with resources and limitations. The commander may be tasked with generating forces in support of missions at the location. The scenario exercise platform provides the commander with realistic movement, force generation and missions. For example, realistic cyber effects that effect command and control may be implemented, and realistic fog-of-war on execution of command and control intent and orders. The cyber effects may prohibit an instance of the exercise scenario platform operating on a computing device of a particular role from receiving updates about the mission, for example. The scenario exercise platform may allow the commander and other A-staff to work through realistic military scenarios. The commander and A-staff may work as a team simultaneously to communicate, operate, decide, and act. Team mode and solo mode may be enabled using the scenario exercise platform. For example, in solo mode, a single user may select a scenario and the scenario exercise platform may simulate the scenario by receiving the actions selected by the user and determining the consequences and states each turn until the scenario is complete. In some embodiments, the user may be associated with a certain role and the scenario exercise platform may simulate the decisions of other roles on the team such that the user is able to train in a simulated team-based environment. The scenario exercise platform may be used for training, certification, and/or testing/review of doctrine.

The scenario exercise platform may include an evaluation system. During a scenario, participants are encouraged to document their decision-making. At the conclusion of the scenario, these choices are compared against optimal or alternative outcomes, and participants can compare their individual and team choices against a "best case." In some instances, the scenarios may not have a "right answer," but rather require difficult tradeoffs with no obvious choice. The evaluation system may serve to "certify" A-staff personnel, like aircrew or maintainer certification.

As described further herein, an artificial intelligence engine may be used to simulate the scenarios. The artificial intelligence engine may be trained to determine responses to actions and/or next states of the scenario in real-time or near real-time to simulate real-world situations that force users to make decisions quickly in intense situations (e.g., combat or emergency situations). In some embodiments, the artificial intelligence engine may include an expert system. In some embodiments, generate one or more machine learning models trained to simulate the scenario. In some embodiments, different machine learning models may be trained to simulate the same scenario but the machine learning models may be trained with different configuration settings, such as different weights, number of nodes, number of hidden layers, activation functions, optimization functions, and the like. In one embodiment, the machine learning models may be scored after a scenario is complete, and the scoring may be based on a percentage of "right" actions, as compared to the "best case", that were performed by the commander and the A-staff. The machine learning model that receives the highest score may be selected and its configuration settings may be applied to other machine learning models performing the scenario or other scenarios. Such a technique may improve feature selection of the machine learning models and enable providing enhanced training to military personnel and more efficient certification. Further, if the machine learning models are tuned to speed up certification by reducing the number of times personnel have to perform the scenario, then computing resources may be saved because fewer scenarios are executed on the computing devices during the training program.

An example experience is now described. Assume Sergeant Smith is tasked with certifying her installation A-staff on a concept related to austere base site selection. Sergeant Smith may user her computing device to visit the library of the scenario exercise platform and download a scenario. Sergeant Smith may review the scenario and customize it for her team and requirements. She may schedule the training with representatives from A2, A3, A4, A6, and the CC, a task made easier with the scenario exercise platform because participants can access the training from anywhere. On the day and time of the training, some individuals may be in their office, others access the scenario exercise platform via their computing device from home, etc. The participants may start the scenario, receive the in-brief via the user interface of the scenario exercise platform, and then proceed through receiving inputs, discussing the evolving situation (e.g., via chatroom on a user interface of the scenario exercise platform, via a microphone and/or smartphone, etc.), and acting. The team may make a final base site selection, the scenario ends, and an out brief takes place that shows how each A-staff member's decisions matched up against "optimal" or "alternative" outcomes.

Figure 1:
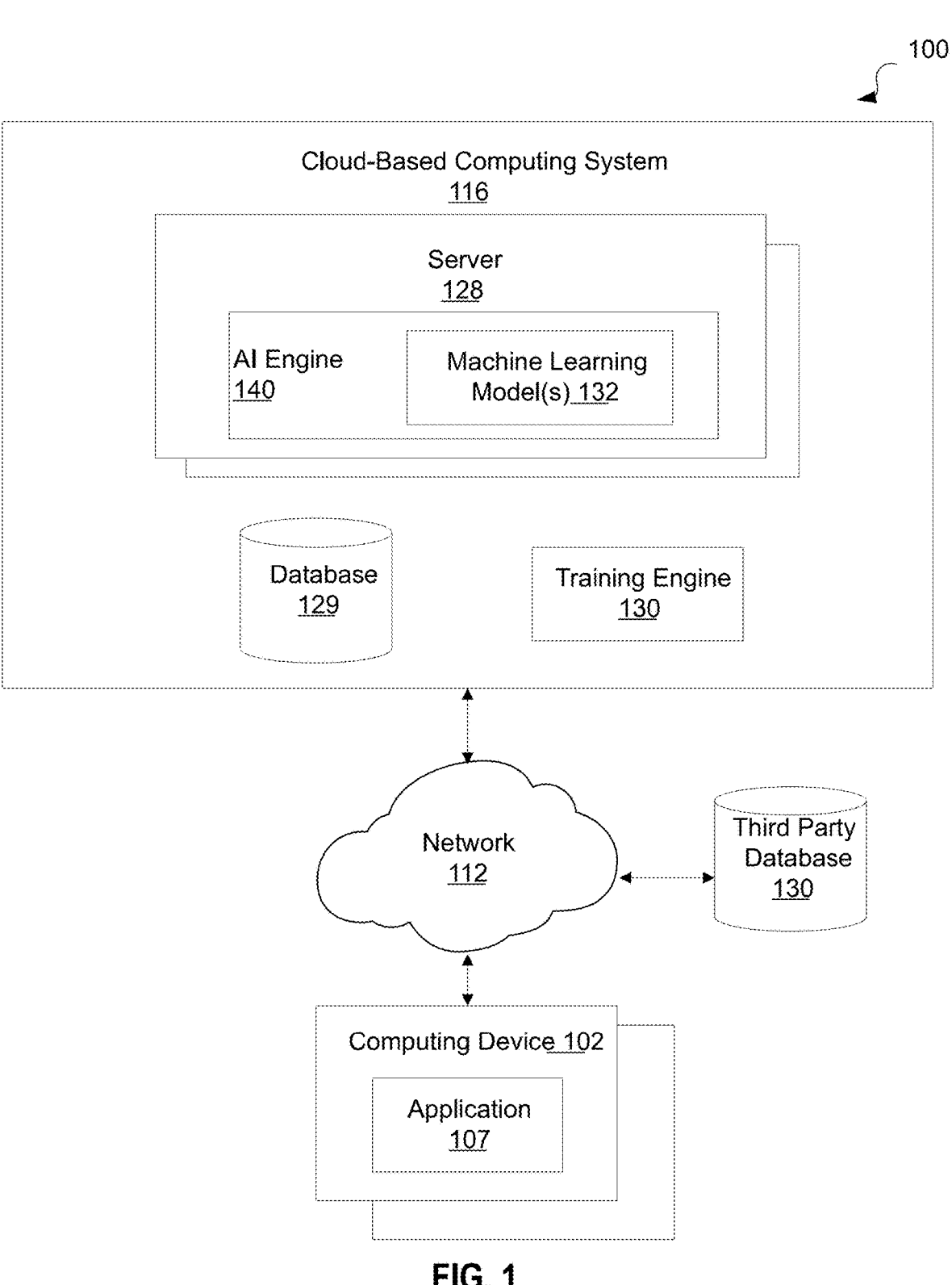
FIG. 1 illustrates a high-level component diagram of an illustrative system architecture according to certain embodiments of this disclosure.

FIG. 1 illustrates a high-level component diagram of an illustrative system architecture 100 according to certain embodiments of this disclosure. In some embodiments, the system architecture 100 may include computing devices 102, a cloud-based computing system 116, and/or a third party database 130 that are communicatively coupled via a network 112. As used herein, a cloud-based computing system refers, without limitation, to any remote or distal computing system accessed over a network link. Each of the computing devices 102 may include one or more processing devices, memory devices, and network interface devices.

The network interface devices of the computing devices 102 may enable communication via a wireless protocol for transmitting data over short distances, such as Bluetooth, ZigBee, near field communication (NFC), etc. Additionally, the network interface devices may enable communicating data over long distances, and in one example, the computing devices 102 may communicate with the network 112. Network 112 may be a public network (e.g., connected to the Internet via wired (Ethernet) or wireless (WiFi)), a private network (e.g., a local area network (LAN), wide area network (WAN), virtual private network (VPN)), or a combination thereof.

The computing device 102 may be any suitable computing device, such as a laptop, tablet, smartphone, or computer. The computing device 102 may include a display that is capable of presenting a user interface of an application 107. The computing device 102 may be operated by members of an A-staff (e.g., commander, logistics person, operation person, communication person, etc.). The application 107 may be implemented in computer instructions stored on a memory of the computing device 102 and executed by a processing device of the computing device 102. The application 107 may be a scenario exercise platform including a AI-enabled simulator and may be a stand-alone application that is installed on the computing device 102 or may be an application (e.g., website) that executes via a web browser. The application 107 may present various screens, notifications, and/or messages to a user. The screens, notifications, and/or messages may pertain to a military scenario in which the A-staff is participating simultaneously in real-time via different computing devices 102. Numerous users of the scenario exercise platform may use the computing devices 102 that are communicatively coupled to each other via the network 112 and engaged in a virtual shared session.

In some embodiments, the cloud-based computing system 116 may include one or more servers 128 that form a distributed, grid, and/or peer-to-peer (P2P) computing architecture. Each of the servers 128 may include one or more processing devices, memory devices, data storage, and/or network interface devices. The servers 128 may execute an artificial intelligence (AI) engine 140 that uses one or more machine learning models 132 to perform at least one of the embodiments disclosed herein. The servers 128 may be in communication with one another via any suitable communication protocol. The servers 128 may enable configuring a military scenario by a user having a particular role. The servers 128 may provide user interfaces that are role-specific to different computing devices of people having certain roles throughout a military scenario. The servers 128 may execute the military scenarios and may determine inputs and options available for subsequent turns based on actions or decisions made in previous turns. The servers 128 may provide briefing messages to the computing devices of the users participating in the military scenario. The servers 128 may provide debriefing messages to the computing devices of the users after the military scenario is complete.

In some embodiments, the cloud-based computing system 116 may include a database 129. The cloud-based computing system 116 may also be connected to a third party database 130. The databases 129 and/or 130 may store data pertaining to military scenarios, users, roles, results of the military scenarios, and the like. The results may be stored for each user and may be tracked over time to determine whether a user is improving or worsening at their role. Further, observations may include indications of which types of actions are successful in improving the success rate of a particular military scenario. Completed military scenarios including actions taken and responses to the actions for each turn in the completed military scenarios may be saved for subsequent playback. For example, a trainer may show the saved completed military scenario to users to explain what the right and wrong actions were during the completed military scenario. The database 129 or 130 may store a library of scenarios that enable the users to select the scenarios and/or share the scenarios.

In some embodiments, the AI engine 140 may implement an expert system. The expert system may simulate the behavior and judgment of an organization, such as the military, including experts. The expert system may obtain "knowledge" entered by the experts in the organization and the expert system may analyze situations, interpret the situation, and make control actions in response to a certain stimuli (e.g., a user of the tabletop platform enters a decision to attack a certain location). The expert system may be configured to advise, provide demonstrations and instructions, derive solutions, diagnose, interpret inputs and provide relevant outputs, predict results, justify and conclude, and/or suggest alternative solutions to a problem. The expert system may use a knowledge base stored in the database 129. The expert system may include an inference engine. The knowledge base may include facts and rules. The rules may specify that if certain actions are taken by the roles of the users during certain turns, then certain responses will result. The specific rules may specify that various information and graphical elements are presented on a user interface for a specific role at a specific turn if a specific action is taken in the previous turn. That is, the specific rules may specify that information is rendered in a specific format that is used and applied to create a desired result: a user interface specific for a role at a specific turn.

The knowledge base contains knowledge in specific domains along with rules in order to solve problems, and form procedures that are relevant to the domain. The inference engine may acquire relevant data form the knowledge base, interpret it, and to find a solution to a problem. The inference engine may use the following strategies to recommend solutions: forward chaining and backward chaining. Forward chaining may refer to the expert system answering the question "what can happen next?" The expert system may follow a chain of conditions and derivations to deduce the outcome after considering all of the facts and rules. The expert system may follow the strategy to determine a conclusion, result, or effect. For example, the expert system may use rules of engagement for military operations when determining whether a computer-controlled virtual aircraft in a simulation is allowed to attack a user-controlled virtual aircraft. Back chaining may refer to the expert system answering the question "why did this happen?" Depending upon what already occurred, the inference engine may identify the conditions that could have happened in the past to trigger the final result. This strategy may be used to find the cause or reason behind something happening. For example, communications may be down between various military personnel in a particular geographical region, and the expert engine may determine that a transmission tower in the global region was disabled by an enemy vehicle if it is known that the enemy vehicle is in the particular geographical region.

The computing system 116 may include a training engine 130 capable of generating one or more machine learning models 132. Although depicted separately from the AI engine 140, the training engine 130 may, in some embodiments, be included in the AI engine 140 executing on the server 128. In some embodiments, the AI engine 140 may use the training engine 130 to generate the machine learning models 132 trained to perform inferencing operations, predicting operations, determining operations, controlling operations, or the like. The machine learning models 132 may be trained to simulate a scenario based on actions and responses, to dynamically update user interfaces for specific roles and specific turns based on one or more actions performed by users having the specific roles in previous turns, to dynamically update user interfaces by changing available information (e.g., resources, personnel, communication state, fog of war, etc.), to select the responses, available information, and next state of the scenario in subsequent turns based on users' actions and combination of actions in previous turns, and/or to improve feature selection of the machine learning models 132 by scoring the results of the scenarios produced, among other things. The one or more machine learning models 132 may be generated by the training engine 130 and may be implemented in computer instructions executable by one or more processing devices of the training engine 130 or the servers 128. To generate the one or more machine learning models 132, the training engine 130 may train the one or more machine learning models 132.

The training engine 130 may be a rackmount server, a router, a personal computer, a portable digital assistant, a smartphone, a laptop computer, a tablet computer, a netbook, a desktop computer, an Internet of Things (IoT) device, any other desired computing device, or any combination of the above. The training engine 130 may be cloud-based, be a real-time software platform, include privacy software or protocols, or include security software or protocols.

To generate the one or more machine learning models 132, the training engine 130 may train the one or more machine learning models 132. The training engine 130 may use a base data set of role-specific information, resources, decisions, actions, and scenario states and outputs pertaining to resulting states of the scenario based on the decisions and/or actions selected by the users. In some embodiments, the base data set may refer to training data and the training data may include labels and rules that specify certain outputs occur when certain inputs are received. For example, if certain roles (e.g., A2 and A3) select certain actions in turn 2, then certain responses/states of the scenario and user interfaces (with customized graphical elements for each A2 and A3) are to be provided in turn 3. In some embodiments, the difficulty of the scenario may be tuned and the machine learning models 132 may be trained accordingly. For example, if the difficulty of the scenario is set to "hard", then resources may be more scarce, cyber effects may be more extreme, enemy combatants may be more prevalent in the scenario, and the like. The machine learning models 132 may be trained by modifying weights of nodes' output, the number of hidden layers, etc. Further, the expert system may modify which rule set is used to simulate the scenario based on the difficulty level selected.

The one or more machine learning models 132 may refer to model artifacts created by the training engine 130 using training data that includes training inputs and corresponding target outputs. The training engine 130 may find patterns in the training data wherein such patterns map the training input to the target output and generate the machine learning models 132 that capture these patterns. Although depicted separately from the server 128, in some embodiments, the training engine 130 may reside on server 128. Further, in some embodiments, the artificial intelligence engine 140, the database 150, or the training engine 130 may reside on the computing device 102.

As described in more detail below, the one or more machine learning models 132 may comprise, e.g., a single level of linear or non-linear operations (e.g., a support vector machine (SVM) or the machine learning models 132 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each artificial neuron may transmit its output signal to the input of the remaining neurons, as well as to itself). For example, the machine learning model may include numerous layers or hidden layers that perform calculations (e.g., dot products) using various neurons. In some embodiments, one or more of the machine learning models 132 may be trained to use causal inference and counterfactuals.

For example, the machine learning model 132 trained to use causal inference may accept one or more inputs, such as (i) assumptions, (ii) queries, and (iii) data. The machine learning model 132 may be trained to output one or more outputs, such as (i) a decision as to whether a query may be answered, (ii) an objective function (also referred to as an estimand) that provides an answer to the query for any received data, and (iii) an estimated answer to the query and an estimated uncertainty of the answer, where the estimated answer is based on the data and the objective function, and the estimated uncertainty reflects the quality of data (i.e., a measure which takes into account the degree or salience of incorrect data or missing data). The assumptions may also be referred to as constraints and may be simplified into statements used in the machine learning model 132. The queries may refer to scientific questions for which the answers are desired.

The answers estimated using causal inference by the machine learning model may include optimized scenarios that enable more efficient training of military personnel. As the machine learning model estimates answers (e.g., scenario outcomes based on alternative action selection), certain causal diagrams may be generated, as well as logical statements, and patterns may be detected. For example, one pattern may indicate that "there is no path connecting ingredient D and activity P," which may translate to a statistical statement "D and P are independent." If alternative calculations using counterfactuals contradict or do not support that statistical statement, then the machine learning model 132 may be updated. For example, another machine learning model 132 may be used to compute a degree of fitness which represents a degree to which the data is compatible with the assumptions used by the machine learning model that uses causal inference. There are certain techniques that may be employed by the other machine learning model 132 to reduce the uncertainty and increase the degree of compatibility. The techniques may include those for maximum likelihood, propensity scores, confidence indicators, or significance tests, among others.

Figure 2:
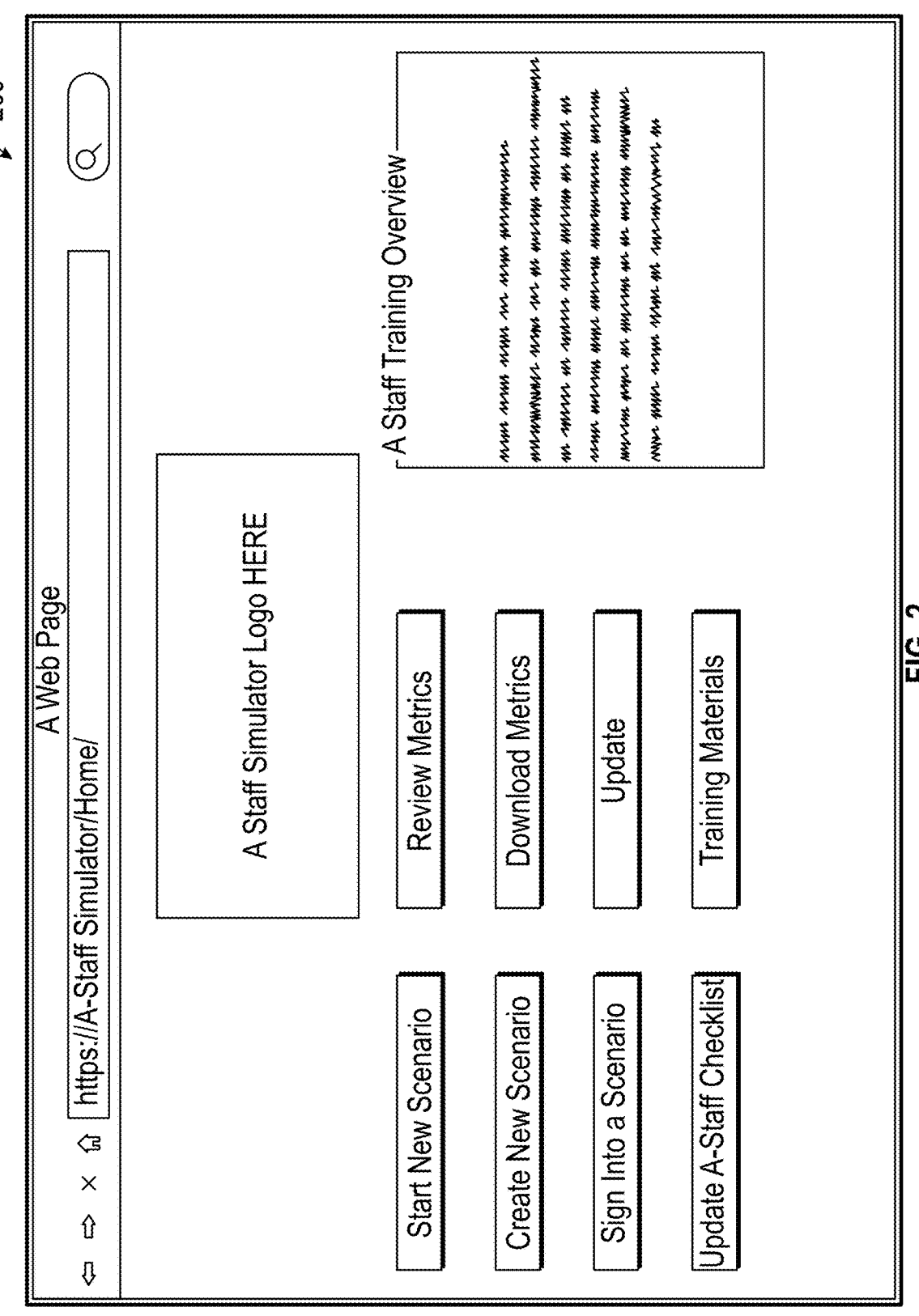
FIG. 2 illustrates an example user interface for a starting screen of the scenario exercise platform according to certain embodiments of this disclosure.

FIG. 2 illustrates an example user interface 200 for a starting screen of the scenario exercise platform according to certain embodiments of this disclosure. The user interface 200 presents a section for a training overview. The user interface 200 also includes various graphical elements (e.g., buttons) for different options, including start new scenario, create new scenario, sign into a scenario, update a-staff (A-staff) checklist, review metrics, download metrics, update, and training materials. The user interface 200 may be presented when a user logs into the scenario exercise platform with their credentials. The options in the user interface 200 may be tailored for a role of the user that logs into scenario exercise platform.

Figure 3:
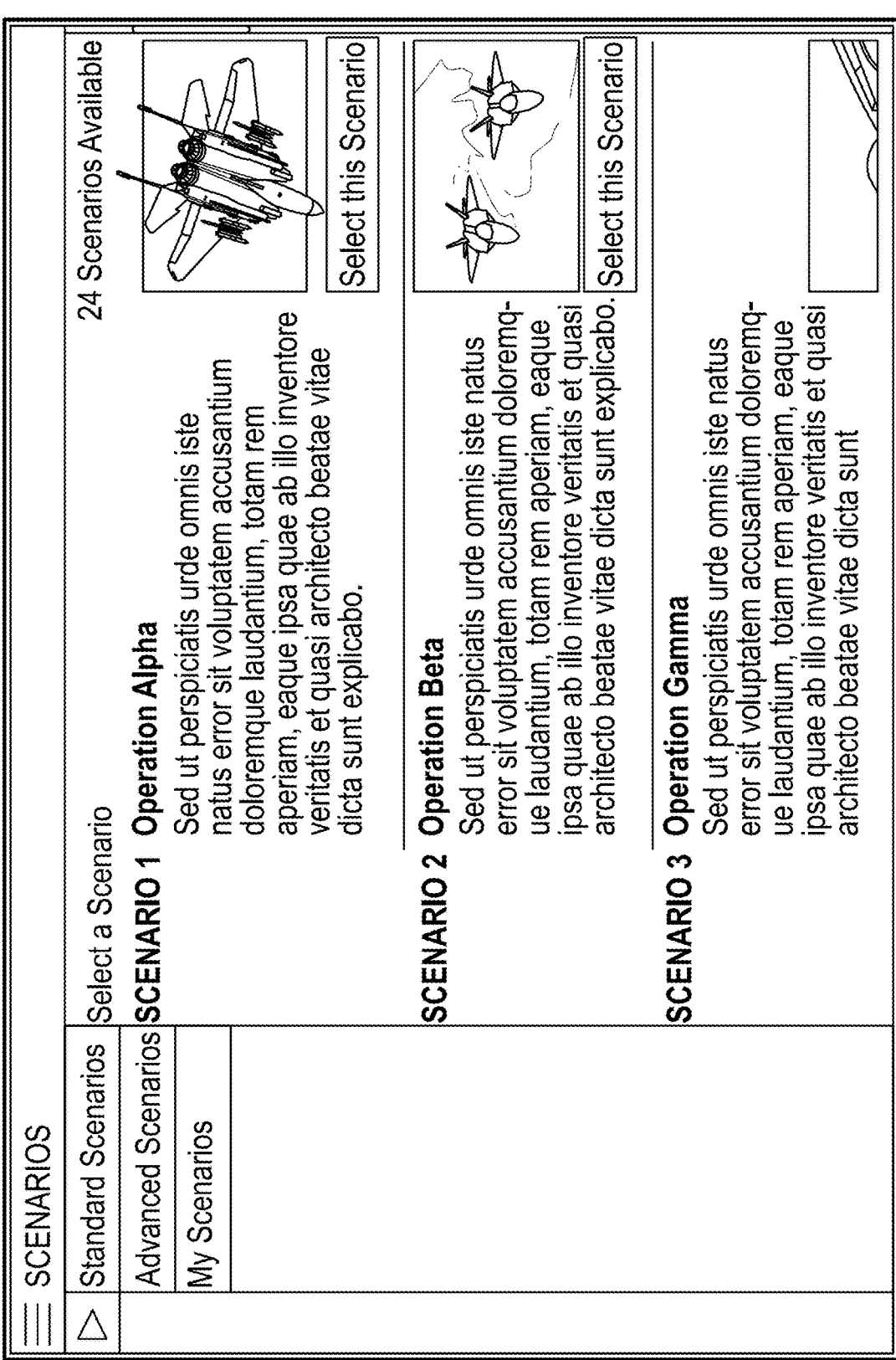
FIG. 3 illustrates an example user interface for a military scenario selection screen according to certain embodiments of this disclosure.

FIG. 3 illustrates an example user interface 300 for a military scenario selection screen according to certain embodiments of this disclosure. As depicted, three scenarios are presented: Operation Alpha, Operation Beta, and Operation Gamma. Each military scenario may include a description of the location, aircraft, resources, objectives, adversaries, targets, and the like. As Each military scenario may also lists the roles that are allowed to participate in the military scenario. For example, for the Operation Alpha military scenario, A2 (intel), A3 (operations), and A4M (logistics) may be selectable roles. Each user that is logged into the scenario exercise platform may select the military scenario in which they want to participate. In some embodiments, a trainer of the scenario may select the roles for the various participants. Numerous computing devices of users participating in the scenario may be communicatively coupled to another via the network 112 in a virtual shared session.

Figure 4:
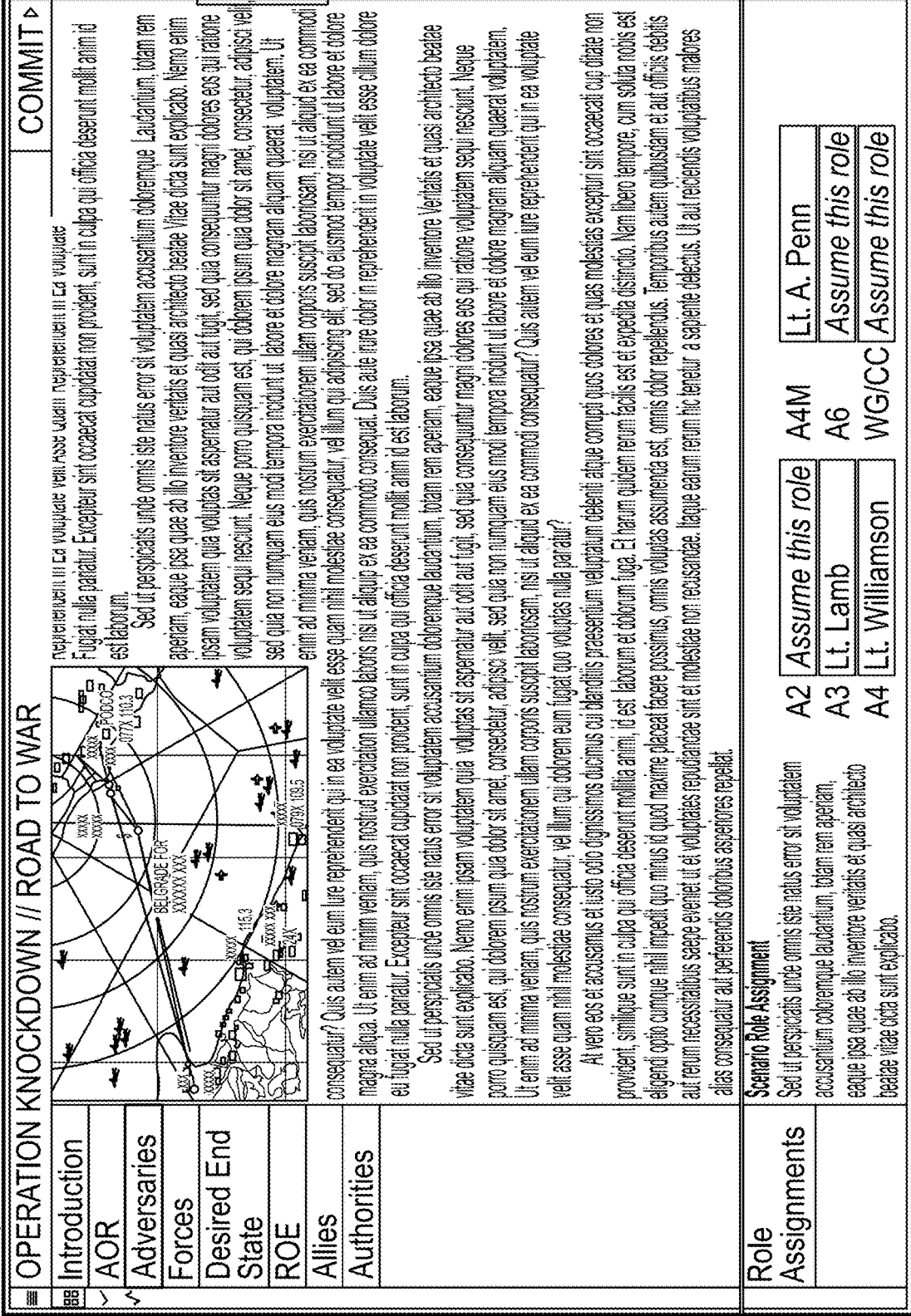
FIG. 4 illustrates an example user interface for a briefing tutorial screen according to certain embodiments of this disclosure.

FIG. 4 illustrates an example user interface 400 for a briefing tutorial screen according to certain embodiments of this disclosure. After the military scenario is selected, the user interface 400 may be presented on each computing device of the users accessing the scenario exercise platform. The user interface 400 may present a briefing message that explains the military scenario. As depicted, the briefing message may be a video that plays in a video player. The user interface 400 also presents the roles that may be selected by the users. From this screen, each user may select a role to play during the military scenario. Various military scenario background information may be presented pertaining to an introduction, AOR, adversaries, forces, desired end state, ROE, allies, and/or authorities. The selection of the military scenario and the role may be transmitted to the cloud-based computing system 116.

The cloud-based computing system 116 may receive the selections and the AI engine 140 may begin the simulation of the military scenario with customized user interfaces for each particular role and each turn, where the user interfaces are dynamically modified in subsequent turns for each role based on the actions on the actions in previous turns.

FIGS. 5-10 each present unique and tailored user interfaces for different roles of users participating in the same military scenario. The information, decisions, actions, etc.

included in the user interfaces is role-specific such that one user interface for one role includes information, decisions, actions, etc. that is not presented on another user interface for another role. The information, decisions, actions, etc. presented in each user interface of FIGS. 5-10 may pertain to a particular round or turn of a series of rounds or turns for a military scenario. The information, decisions, actions, etc. presented in subsequent rounds or turns may depend on the input received during the current round or turn. The user interfaces may be generated by the AI engine 130. It should be noted that the user interfaces in FIGS. 5-10 may be presented on different respective computing devices simultaneously in a virtual shared session for the users that are participating in the same instance of the military scenario. The user interfaces may be presented in real-time or near real-time. The actions selected by the user using graphical elements of the user interfaces may be used by the AI engine 130 to determine the state of the scenario in the next turn and to generate the user interfaces that are presented for each role of users participating in the military scenario. It should also be noted that separate groups of users may concurrently participate in different military scenarios at the same time using the exercise scenario platform.

Figure 5:
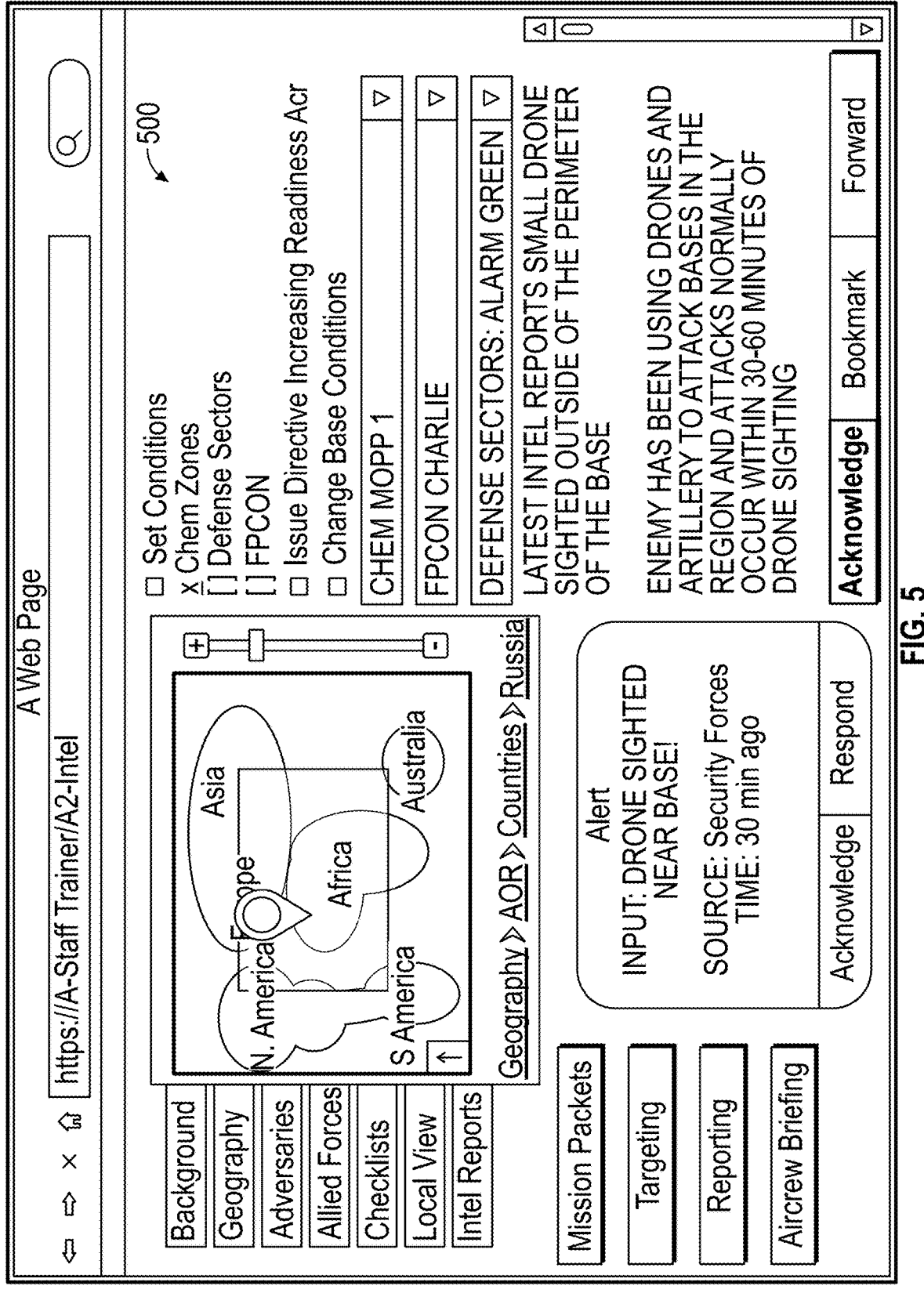
FIG. 5 illustrates an example user interface for a user having an intel role according to certain embodiments of this disclosure.

FIG. 5 illustrates an example user interface 500 for a user having an intel role according to certain embodiments of this disclosure. As depicted, the user interface 500 includes an input that indicates a drone is sighted near a base. The user interface 500 also presents the source (security forces) and a time (30 minutes ago). The user interface 500 presents options to acknowledge the alert and respond to the alert. The user interface 500 also presents a geographical map that pinpoints the location of the drone sighting. The information presented on the user interface 500 may pertain to a particular turn in a series of turns. The information presenting on the user interface 500 in a subsequent turn may depend on the action of the user having the intel role in the current turn. The user interface 500 includes options for background resources (e.g., background, geography, adversaries, allied forces, checklists, local view, intel reports), decision input (mission packets, targeting, reporting, aircrew briefing), staff checklists (set conditions, chem zones, defense sections, fpcon, issue directive increasing readiness, change base conditions), and a realtime feed (Latest intel reports small drone sighted outside of the perimeter of the base. Enemy has been using drones and artillery to attack bases in the region and attacks normally occur within 30-60 minutes of drone sighting). The decision inputs may be actions.

Figure 6:
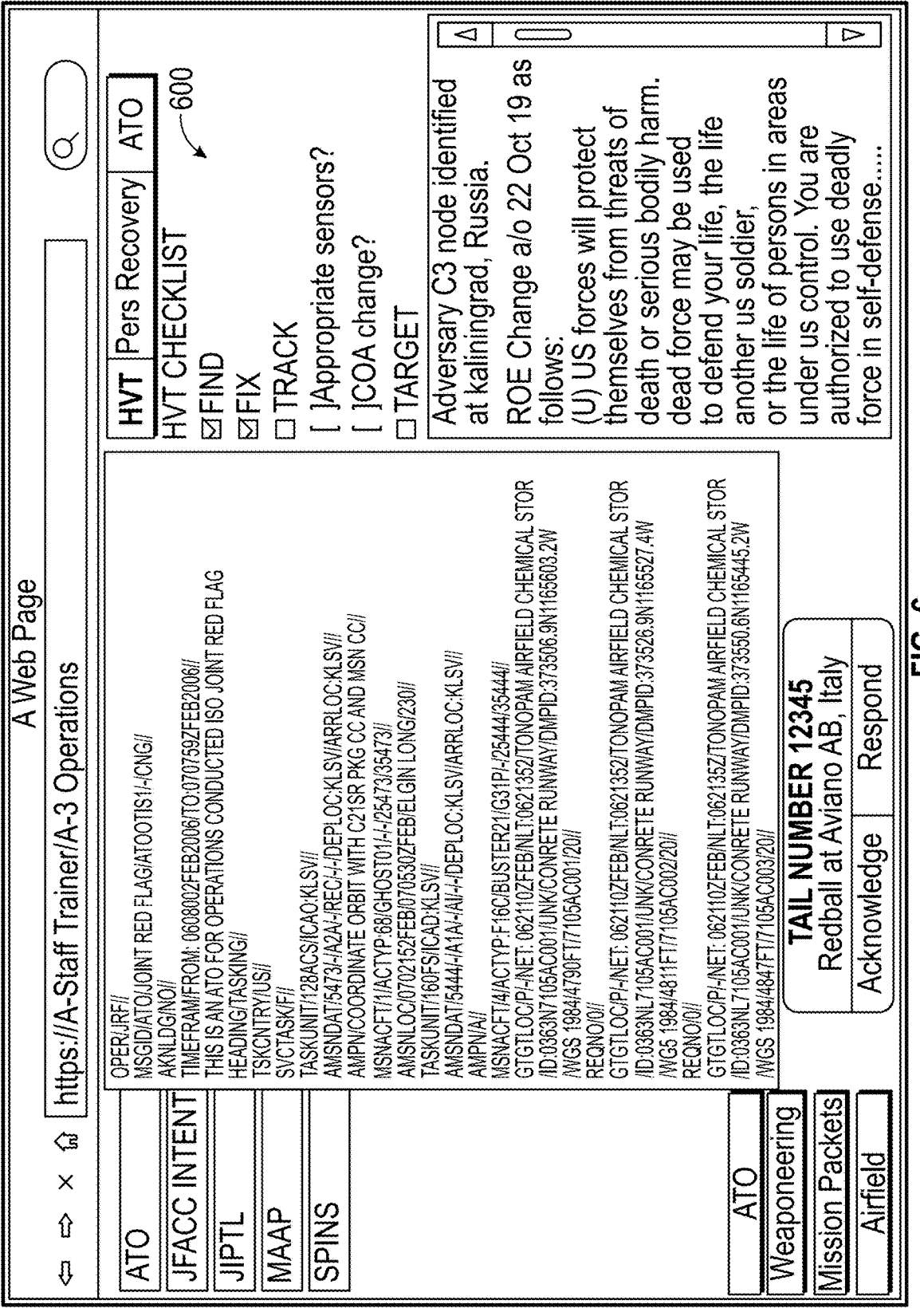
FIG. 6 illustrates an example user interface for a user having an operations role according to certain embodiments of this disclosure.

FIG. 6 illustrates an example user interface 600 for a user having an operations role according to certain embodiments of this disclosure. The user interface 600 includes options for background resources (e.g., ATO, JFACC Intent, JIPTL, MAAP, SPINS), decision input (ATO, weaponeering, mission packets, airfield), staff checklists (find, fix, track, appropriate sensors?, COA change?, target), and a realtime feed (adversary C3 node identified at Kaliningrad, Russia. ROE Change a/o 22 Oct. 19 as follows: (U) US forces will protect themselves from threats of death or serious bodily harm. Deadly force may be used to defend your life, the life of another US soldier, or the life of persons in areas under US control . . . ). There is also a pop-up with current information (TAIL NUMBER 12345 Redball of Aviano AB, Italy). The decision inputs may be actions.

Figure 7:
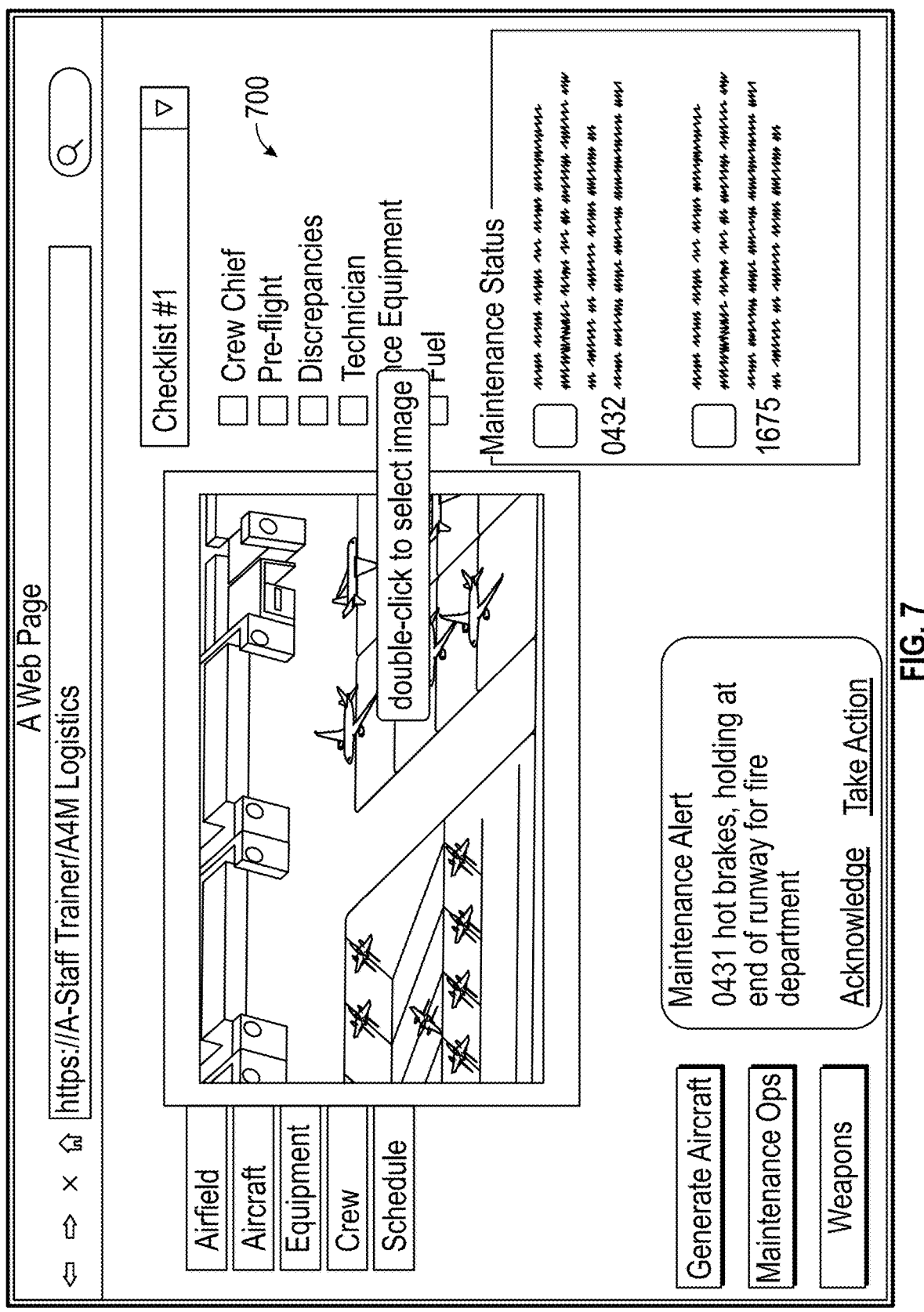
FIG. 7 illustrates an example user interface for a user having a logistics role according to certain embodiments of this disclosure.

In the depicted user interface 600 for the current turn, A3 had an aircraft go "red ball" (e.g., breakdown) at Aviano. A3 needs to review resources (ATO and SPINS) and make a recommendation to the commander. The choice will be reflected in a change to the ATO. The new ATO will carry-over into the next turn and have subsequent branching impacts (e.g., available aircraft, ordnance or targets). The branching impacts may be configured by a user that creates the scenario using the scenario creator tool of the exercise scenario platform. The scenario creator tool may include a user interface that provides a timeline of events the user can configure and provides graphical elements that represent branches of events that will occur if a user having a particular role makes a particular decision. The scenario creator can drag-and-drop graphical elements representing events and/or resources on the user interface including the timeline of events including the branches FIG. 7 illustrates an example user interface 700 for a user having a logistics role according to certain embodiments of this disclosure. The user interface 700 includes options for background resources (e.g., airfield, aircraft, equipment, crew, schedule), decision input (e.g., generate aircraft, maintenance ops, weapons), staff checklists (crew chief, preflight, discrepancies, technician, etc.), and a realtime feed (maintenance status)). There is also a pop-up with current information (maintenance alert: 0431 hot brakes, holding at end of runway for fire department). The decision inputs may be actions.

Figure 8:
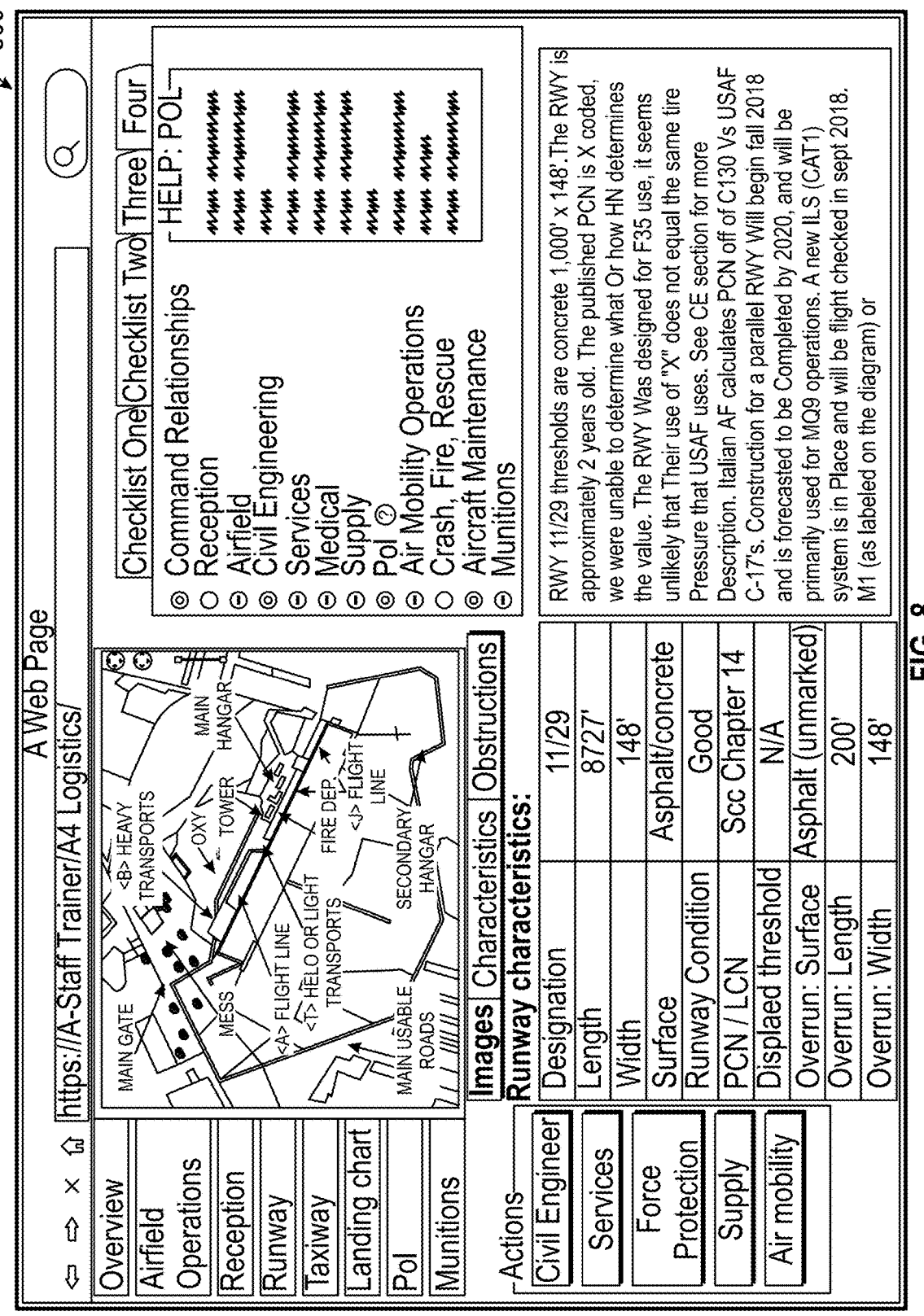
FIG. 8 illustrates another example user interface for a user having a logistics role according to certain embodiments of this disclosure.

FIG. 8 illustrates another example user interface 800 for a user having a logistics role according to certain embodiments of this disclosure. The user interface 800 includes options for background resources, staff checklists, decision inputs, and a realtime feed. The user interface 800 provides supply choices that, when selected, have an impact throughout the scenario. For example, if the user selects to use a particular hangar, then only the aircraft that are included in that hangar may be available for deployment and use throughout the rest of the scenario. There is also a pop-up with current information (runway characteristics). The decision inputs may be actions (e.g., civil engineer, services, force protection, supply air mobility).

Figure 9:
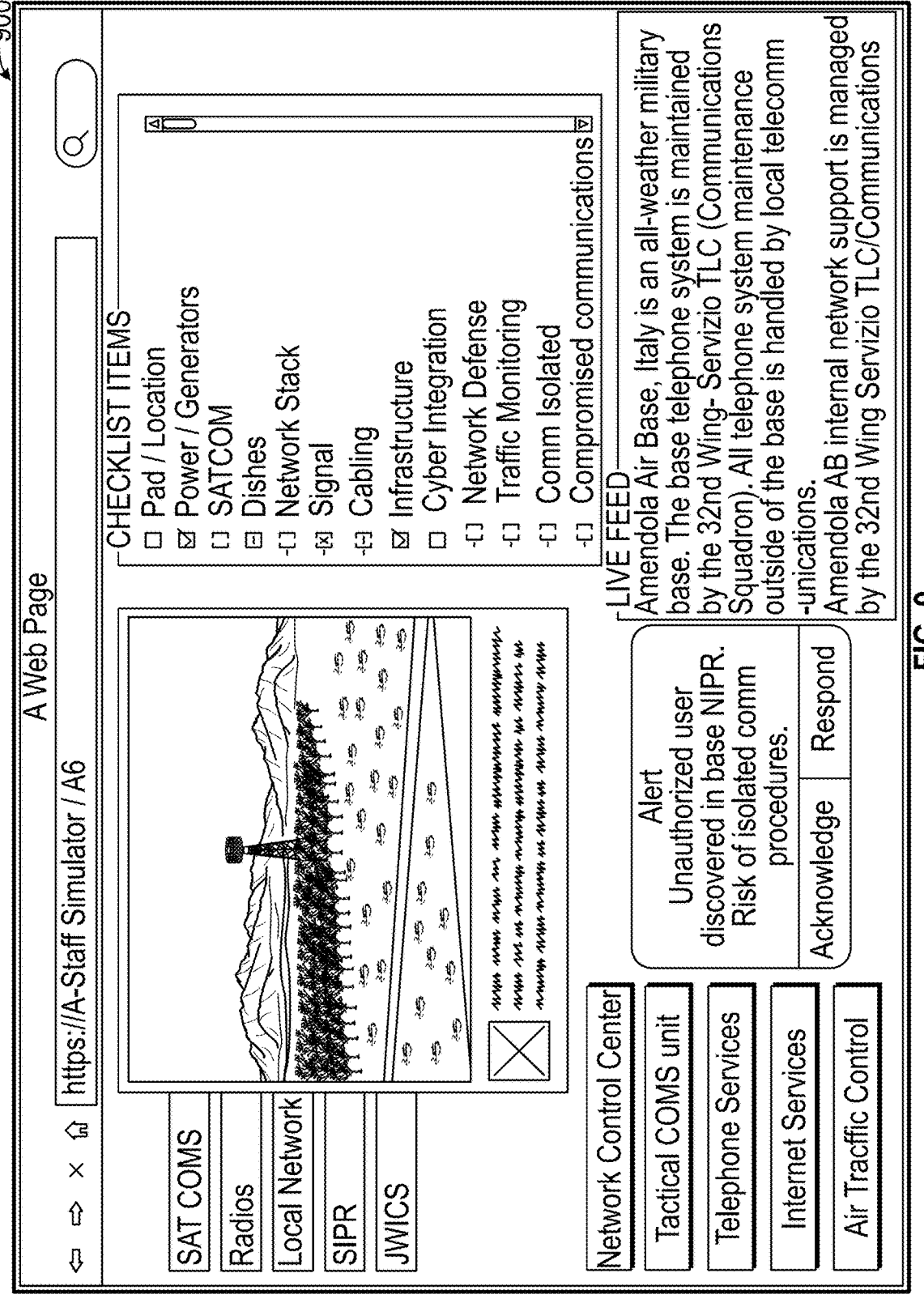
FIG. 9 illustrates an example user interface for a user having a communications role according to certain embodiments of this disclosure.

FIG. 9 illustrates an example user interface 900 for a user having a communications role according to certain embodiments of this disclosure. The user interface 900 includes options for background resources, staff checklists, decision inputs, and a real-time feed. The real-time feed may include information pertaining to the local geographical region. For example, the real-time feed presents information about the "Amendola Air Base, Italy". In some embodiments, the real-time feed may refer to live data sources that enable different courses of action to be tested in rea-time or near real-time before a commander's decision is made. The information may be received from the database 129 or 130 or any suitable source. For example, the AI engine 130 may be communicatively coupled to an application programming interface that provides the information in the realtime feed. There is also a pop-up with current information (runway characteristics). The decision inputs may be actions (e.g., Newark control center, tactical COMS unit, telephone services, internet services, air traffic control).

Figure 10:
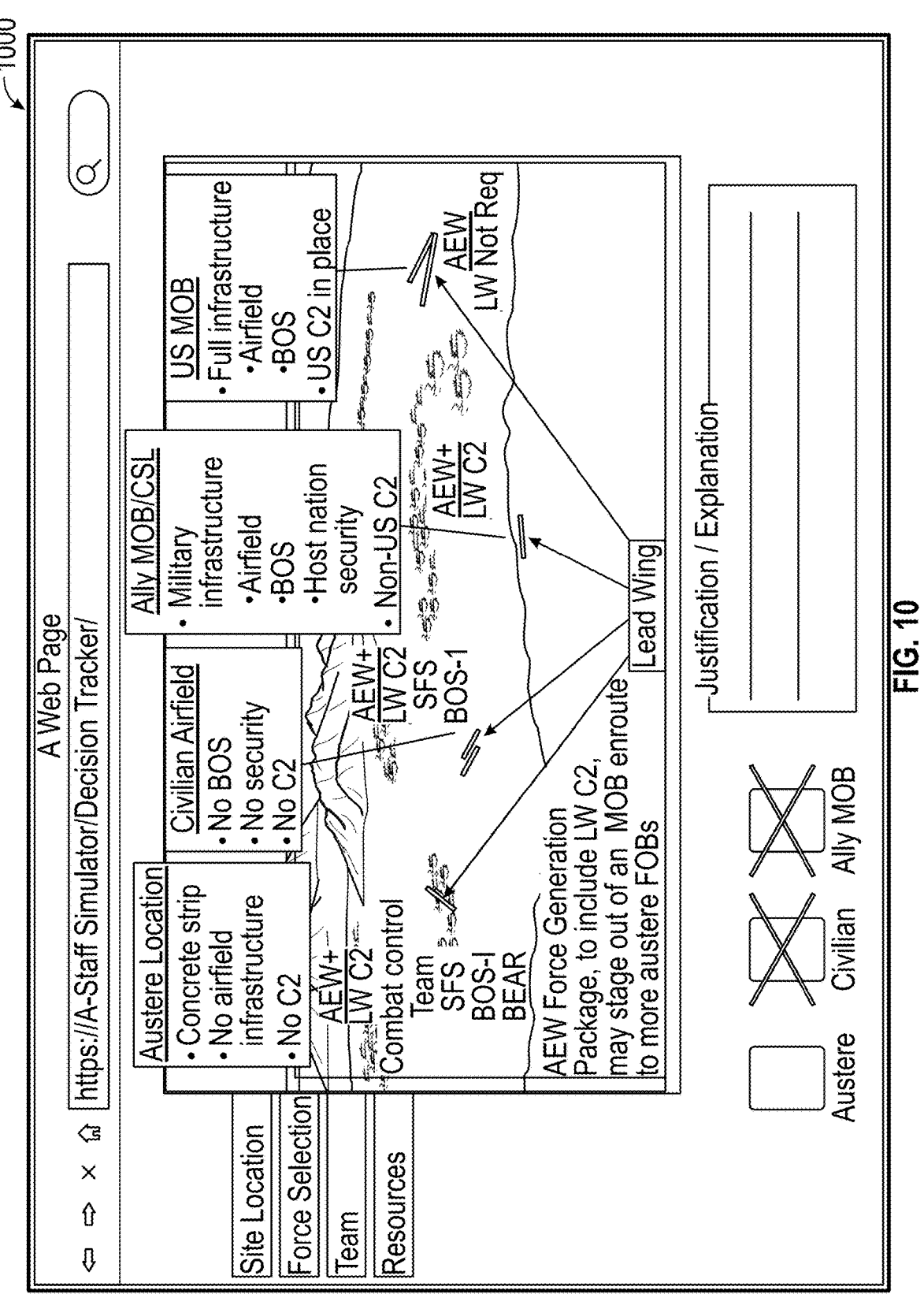
FIG. 10 illustrates an example user interface for a user having a commander role according to certain embodiments of this disclosure.

FIG. 10 illustrates an example user interface 1000 for a user having a commander role according to certain embodiments of this disclosure. The user interface 1000 may be used by user having the commander role to make a decision that is executed by the A-staff. The simulation of the military scenario may proceed to the next input based on the decision (e.g., the military scenario simulation is adjusted by the AI engine 130 based on the decisions made). In the depicted example, the commander role selects which airfield to deploy to, which has consequences in subsequent turns in the military scenario. The consequences may pertain to resources available, aircraft available, adversaries nearby, weather conditions, etc.

Figure 11:
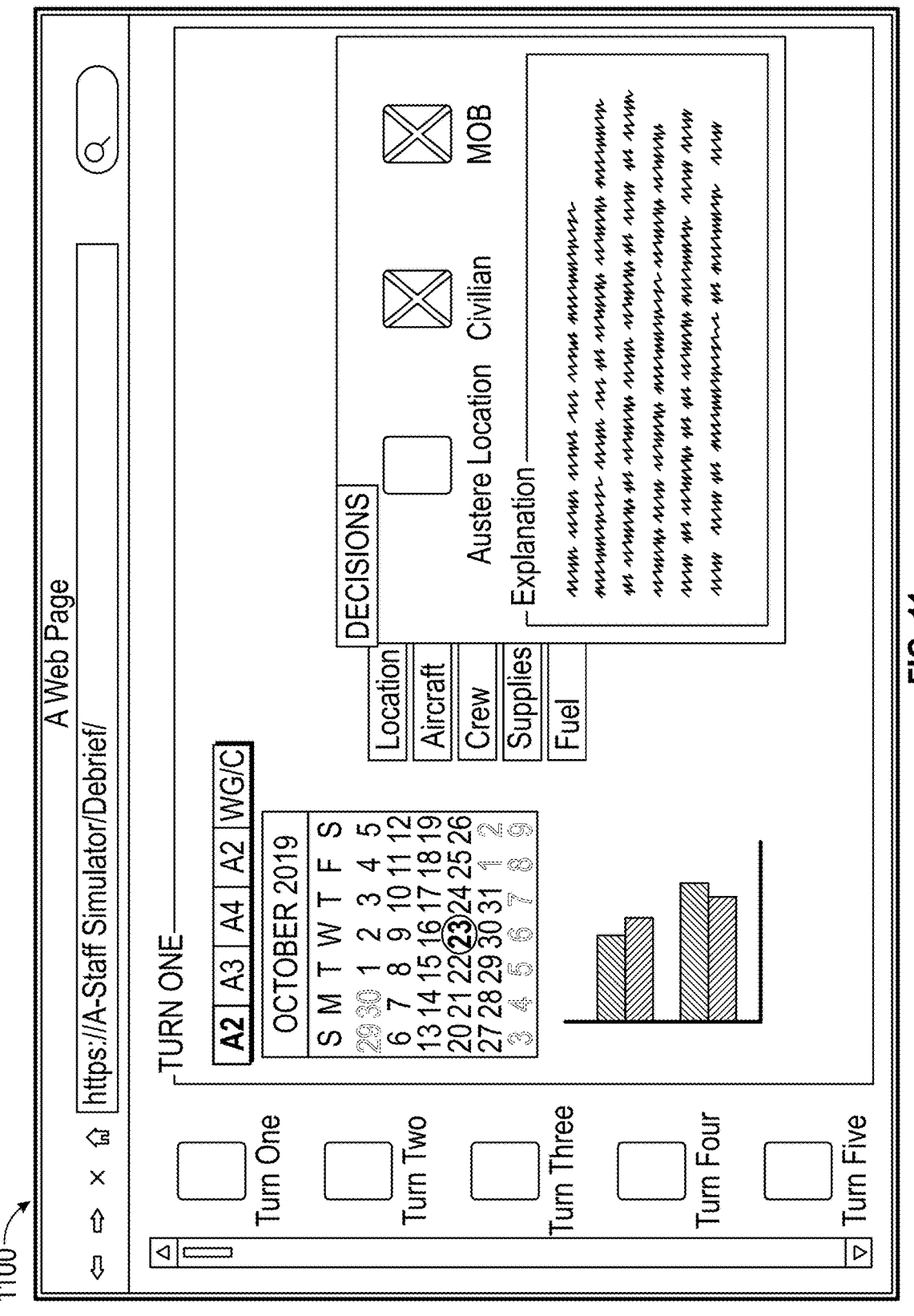
FIG. 11 illustrates an example user interface for a debriefing screen according to certain embodiments of this disclosure.
Figure 12:
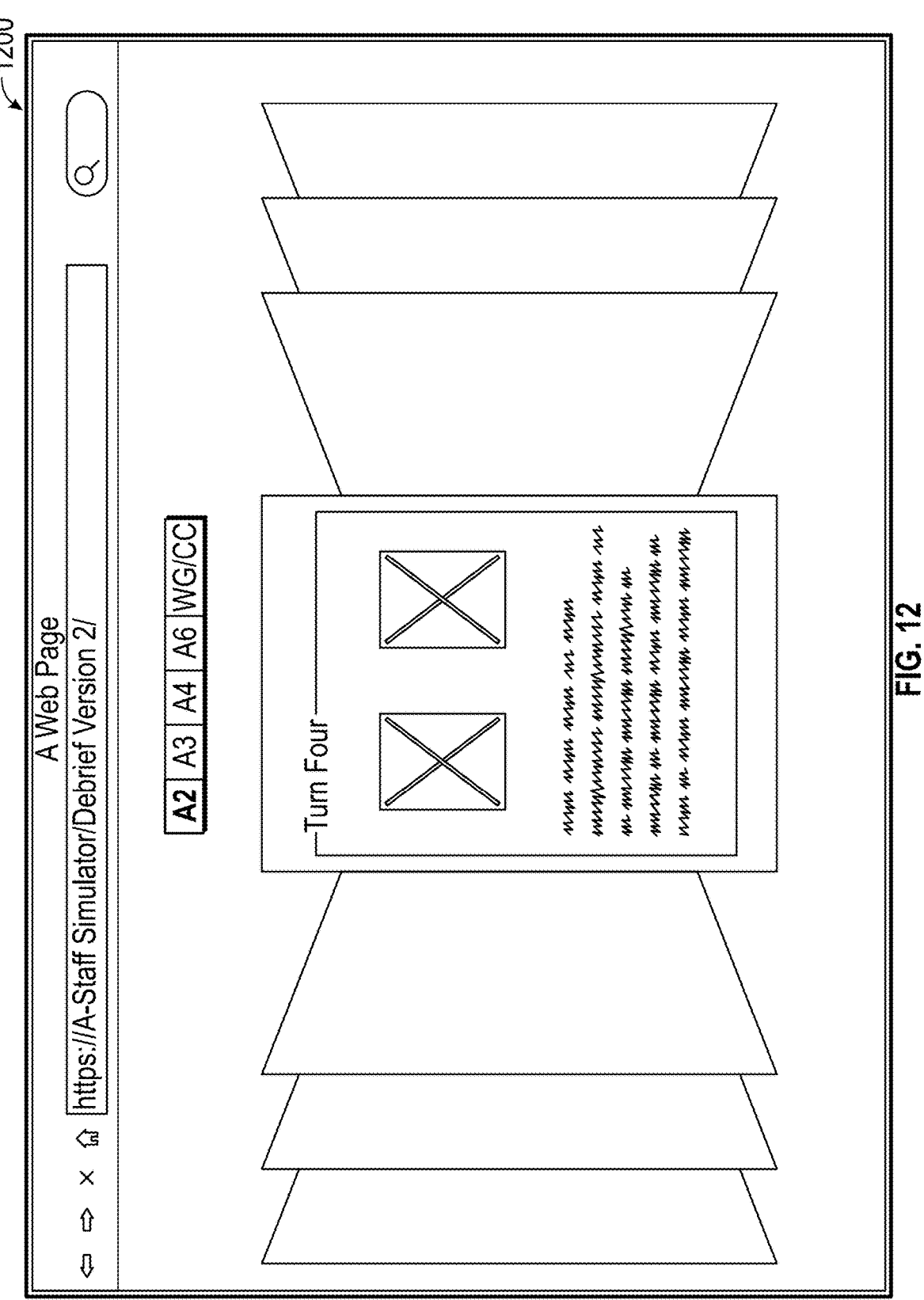
FIG. 12 illustrates another example user interface for a debriefing screen according to certain embodiments of this disclosure.

FIG. 11 illustrates an example user interface 1100 for a debriefing screen according to certain embodiments of this disclosure. As depicted, the user interface 1100 presents decisions made by each user having a particular role at each turn in a series of turns. In the depicted example, the user having the A2 role (intelligence) is being analyzed at turn one. The information includes their decisions at turn one as well as information pertaining to location, aircraft, crew, supplies, and fuel. The user interface 1100 may present overall results of the military scenario and the outcome of the military scenario based on the decisions made by the A-staff. FIG. 12 illustrates another example user interface 1200 for a debriefing screen according to certain embodiments of this disclosure. As presented, the user interface 1200 may include various pages that are each associated with a turn. Each page summarizes the actions taken by a user having a particular role during that turn. The user may scroll through turns from left-to-right or right-to-left and the pages may graphically "flip" accordingly.

Figure 13:
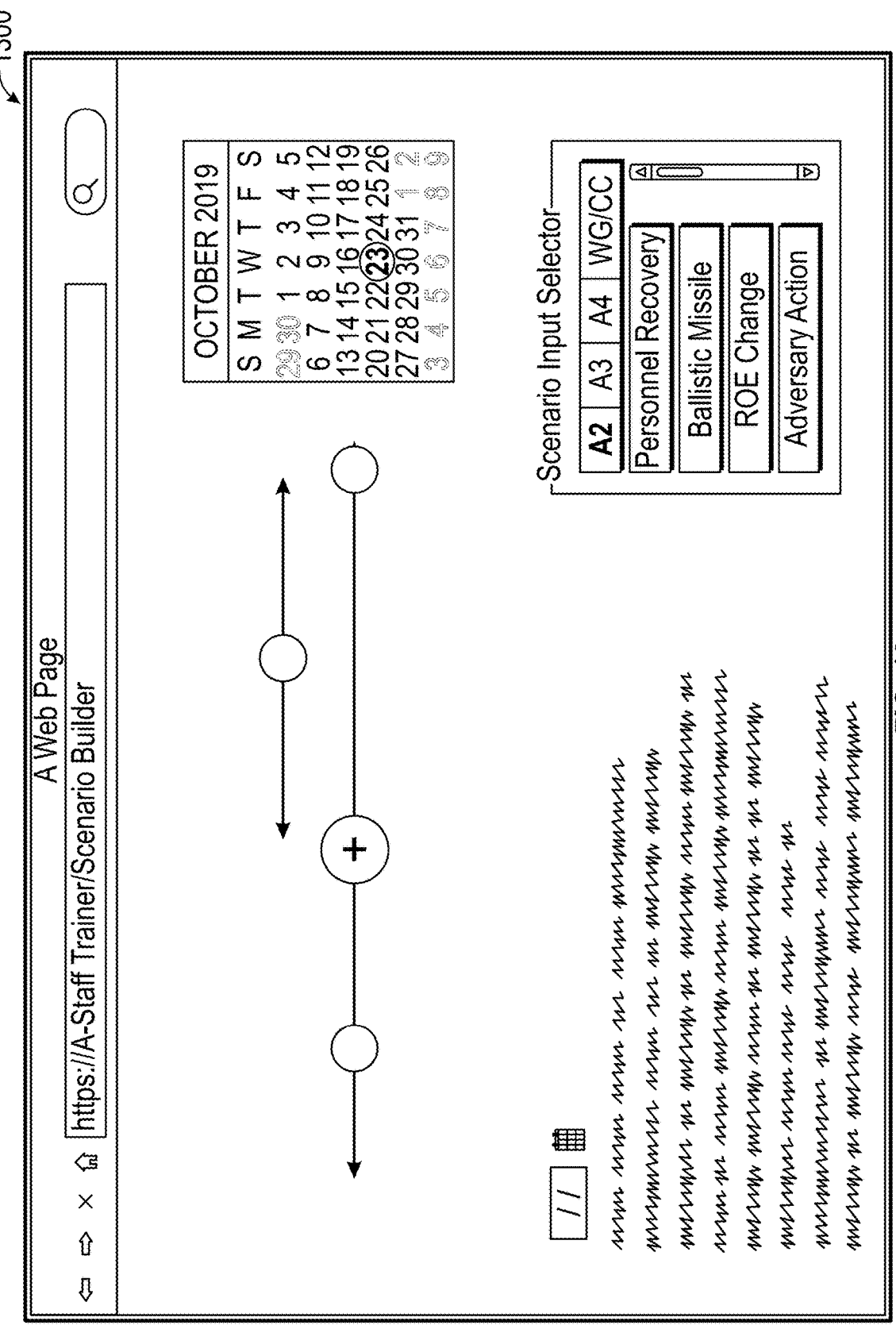
FIG. 13 illustrates an example user interface for a military scenario building screen according to certain embodiments of this disclosure.

FIG. 13 illustrates an example user interface 1300 for a military scenario building screen according to certain embodiments of this disclosure. The user interface 1300 is associated with the scenario creator tool. To ensure lasting relevance, the scenario exercise platform may include the scenario builder shown in the user interface 1300. The scenario builder enables an evaluator/instructor to create and select events, place them on a timeline, and share them with others. A drag and drop functionality may be used to build the military scenarios using the user interface 1300. The scenario input selector shows the ability to select a role and assign a particular event for that role. As depicted the role A2 is selected, and the evaluator/instructor may select personnel recovery, ballistic missile, ROE change, or adversary action. For example, the evaluator/instructor may choose the adversary action and place it on the timeline at a particular date. Various settings and parameters may be configured for the adversary action. For example, the adversary action may include an enemy aircraft entering air zone of a base. There may be various actions that are configured for a participant, such as try to communicate with the enemy aircraft, deploy one or more aircraft to deter the enemy aircraft out of the air zone, attack the enemy aircraft, and the like. Any suitable events for any suitable role may be configured for a military scenario using the user interface 1300.

Advanced functionality may enable adjusting the military scenario on the fly (e.g., changing degrees of degradation, threat, etc.). Additional participants may be added (e.g., cyber protection team, battle captain) and "campaign players" (joint forces air component commander, defense logistics agency, air operations center). EUCOM and INDOPACOM may be added as specific environment with unique theater conditions.

Figure 14:
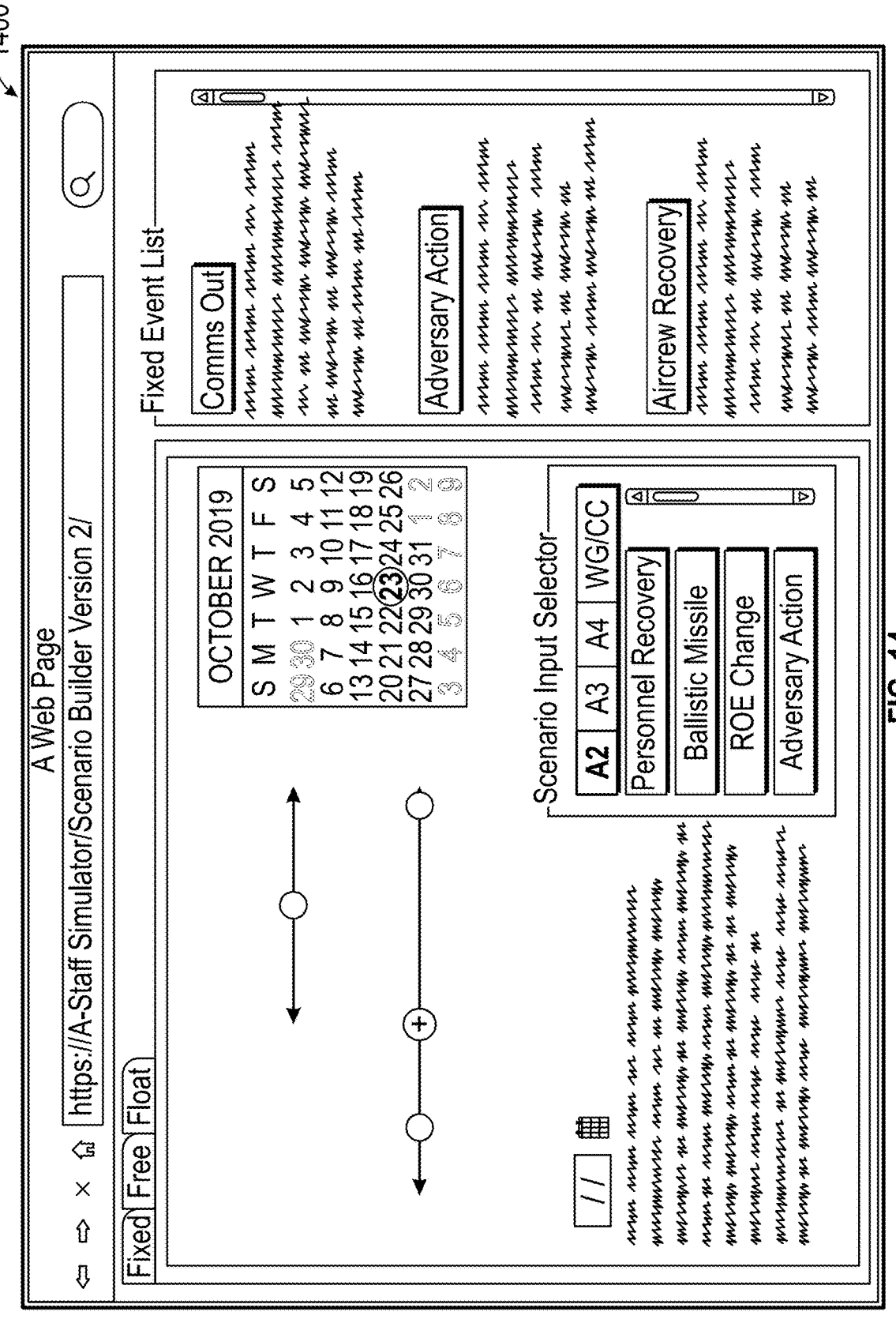
FIG. 14 illustrates another example user interface for a military scenario building screen according to certain embodiments of this disclosure.

FIG. 14 illustrates another example user interface 1400 for a military scenario building screen according to certain embodiments of this disclosure. The user interface 1400 includes a section for fixed event list. The fixed event list may include communication out, adversary action, aircrew recovery. The fixed event list may include events that are required for a particular turn. For example, these events may be included in the list because they are required as part of a particular protocol or doctrine. To obtain certification, the participants have to at least be exposed and handle the events in the fixed list.

Figure 16:
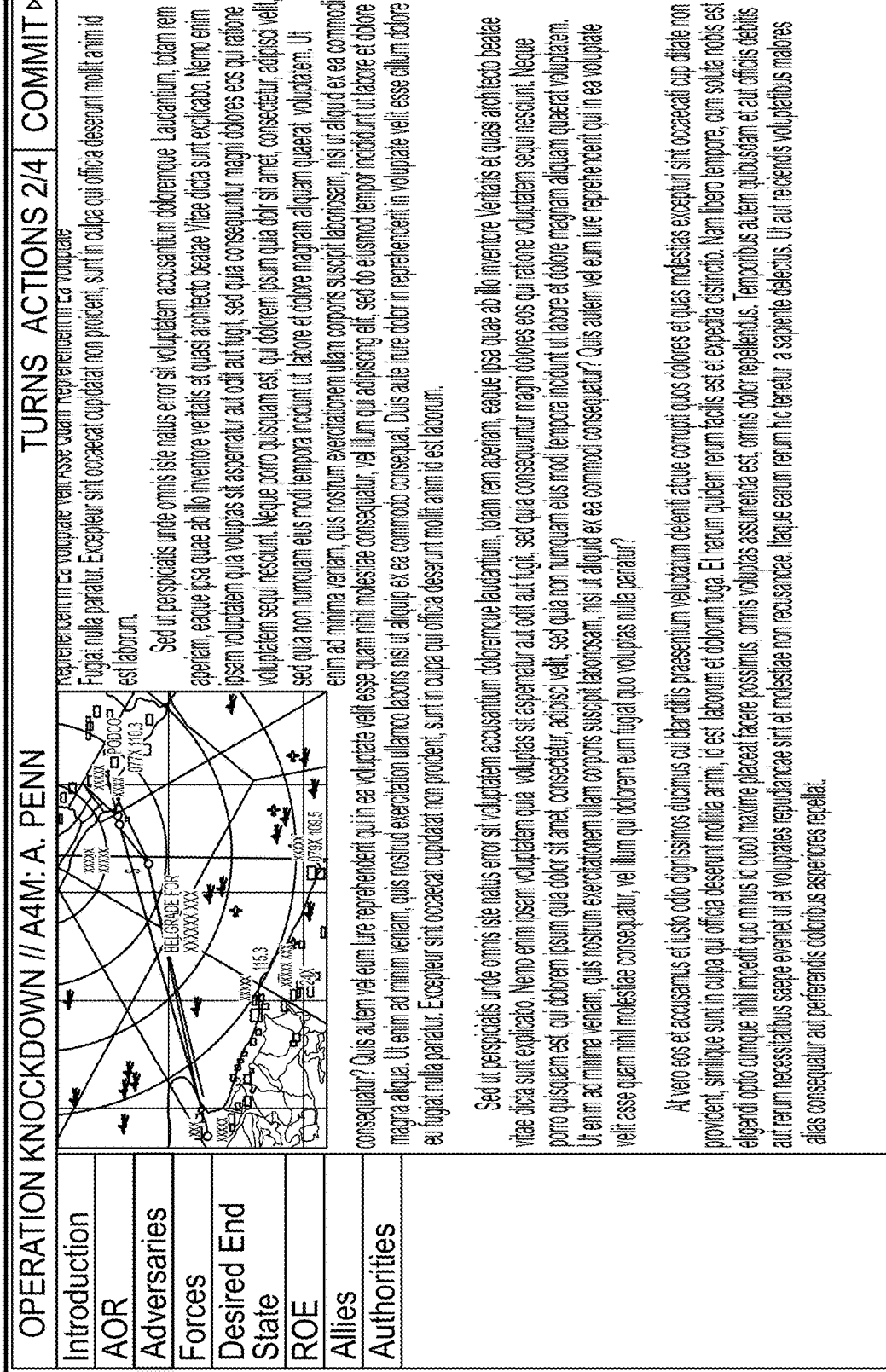
FIG. 16 illustrates an example user interface presenting adversaries during a military scenario according to certain embodiments of this disclosure.

FIG. 15 illustrates an example user interface 1500 of the scenario exercise platform executing on a mobile device according to certain embodiments of this disclosure. As depicted, various tabs may be used to organize information during a turn of the military scenario presented on the user interface 1500. The tabs may enable presenting relevant information in a manner that does not inundate the small screen of the mobile device. Accordingly, the user interface 1500 provides an enhanced experience for users using the scenario exercise platform. Further, various actions may be presented via graphical elements on the user interface 1500. FIG. 16 illustrates an example user interface 1600 presenting adversaries during a military scenario according to certain embodiments of this disclosure. The adversaries are marked on a geographic map of the location at which the military location is taking place. The user may select the adversaries by using an input peripheral and the user may select an action to perform. The action may include communicating with the adversary, attacking the adversary, etc. The AI engine 130 may receive the selection once the user selects the graphical element "COMMIT". The AI engine 130 may determine a response or state of the scenario based on the received action pertaining to the adversary. For example, if the user selected to attack the adversary, the AI engine 130 may analyze characteristics of the adversary, such as type of aircraft, type of weapons included on the aircraft, pilot experience level, amount of fuel, etc. as well as analyze characteristics of the user and the user's aircraft. The AI engine 130 may determine whether the user or the adversary wins the fight and provides the corresponding output in a user interface of the subsequent turn.

Figure 17:
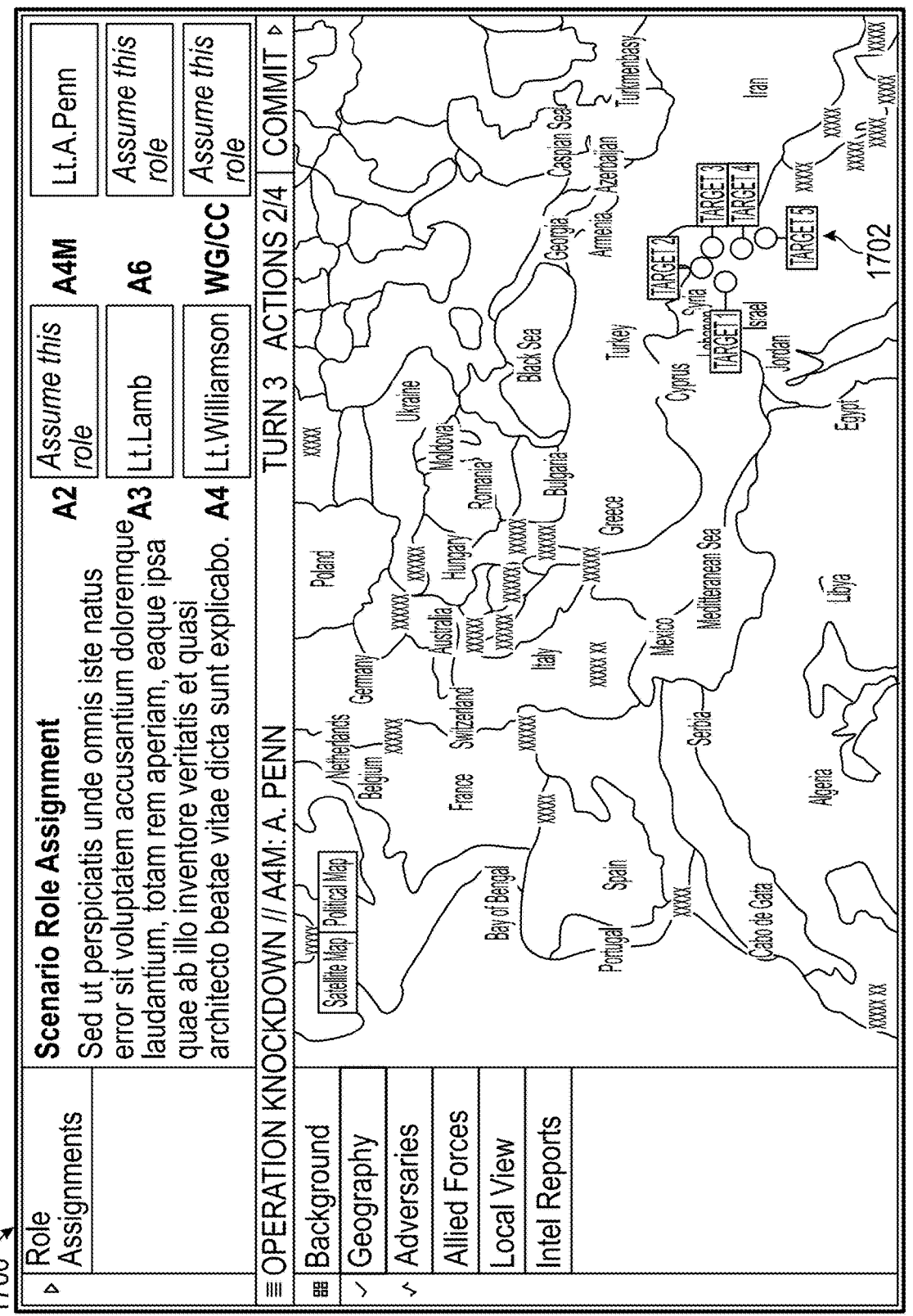
FIG. 17 illustrates an example user interface presenting role assignments and a geography involved in a military scenario according to certain embodiments of this disclosure.

FIG. 17 illustrates an example user interface 1700 presenting role assignments and a geography involved in a military scenario according to certain embodiments of this disclosure. The user interface 1700 includes graphical elements 1702 (e.g., circles) representing targets that are selectable on the user interface 1700. The roles may be chosen and assigned to various targets 1702 and submitted to the AI engine 130. As depicted, the user interface 1700 represents the third turn and action two of four.

FIG. 18 illustrates an example user interface 1800 presenting targets and aircraft involved in a military scenario according to certain embodiments of this disclosure. The user interface 1800 enables selecting targets (primary and secondary), as well as presenting information pertaining to aircraft, airfield, equipment, crew, and/or schedule. The user interface 1800 is customized for a user having the role A4. A3 is prompted to select the aircraft for a mission based on instructions from another user having role A4. Thus, the users are enabled to interact with each other and work together during the virtual shared session associated with the military scenario. Based on their status (e.g., ground, airborne), A4 can select that various aircraft each represented in a row and deploy them to a primary target and/or secondary targets. The consequences of where the aircraft are deployed will affect the next turn or turns of the military scenario and may be determined by the AI engine 130.

FIG. 19 illustrates an example user interface 1900 presenting aircraft and annotations for a decision involved in a military scenario according to certain embodiments of this disclosure. The user interface 1900 enables generating aircraft for a military scenario, maintenance operations, and weapons. A user may also provide annotations for any decisions made related to why certain aircraft were selected for the military scenario.

FIG. 20 illustrates an example user interface 2000 presenting an aircraft selection and generation screen according to certain embodiments of this disclosure. The user interface 2000 presents images of various aircraft available at an airfield. The user may select one of the aircraft to add it to a packet, add it to a military scenario, deleted it from the airfield, etc. For example, the user may use an input peripheral (e.g., touchscreen, mouse, keyboard, microphone, etc.) to select one or more graphics representing the aircraft in the user interface 2000 to cause the aircraft to be added to a mission.

FIG. 21 illustrates an example user interface 2100 presenting a site location selection screen according to certain embodiments of this disclosure. The user may select the site of an airfield for the aircraft to be deployed to. As depicted, Option A is Airbase Alpha and Option B is Airbase Beta. The user interface 2100 is tailored for a user having a role of commander. The site selected may affect the aircraft available, resources available, nearby adversaries, etc.

FIG. 22 illustrates an example user interface 2200 presenting an event log screen according to certain embodiments of this disclosure. As depicted, at 15:05:34 an event describes a drone sighted near base. The event log also includes a status (acknowledged, forwarded, cleared) for each row.

FIG. 23 illustrates an example user interface 2300 presenting a scenario builder screen according to certain embodiments of this disclosure. The user interface 2300 depicted is associated with turn 5 of a military scenario. As depicted, the user interface 2300 presents various modules related to random event, property state change, and user actions committed. The user has selected the user actions committed module and associated a random event to occur when a user's actions have been committed. For example, the random event relates to a probability an air force base (AFB) is lost. As depicted, the random event module instance is linked to the user actions committed module and includes various configurations. The random event module instance may be dragged and dropped into a timeline portion 2302 of the user interface 2300. One configuration indicates AFB 1 has a 50% probability of being lost (e.g., destroyed), which may be adjusted via a slider graphical element. Another configuration indicates AFB 2 has a 35% probability of being lost (e.g., destroyed), which may be adjusted via a slider graphical element. Another configuration indicates AFB 2 & 3 has a 15% probability of being lost (e.g., destroyed), which may be adjusted via a graphical slider.

The user interface 2300 also depicts that a property state change module instance is linked to each respective configuration of the random event module instance. For example, the property state change module instance linked to the "AFB 1 Lost" configuration specifies that AFB 1 is removed from being an available option in the military scenario. The property state change module instance linked to the "AFB 2 Lost" configuration specifies that AFB 2 is removed from being an available option for 4 turns. Accordingly, the user interface 2300 enables granular property state changes for specific amounts of turns. The property state change module instance linked to the "AFB 2 & 3 Lost" configuration specifies that AFB 2 & 3 are removed from being an available option in the military scenario. The scenario may be saved and stored in the database 129.

FIG. 24 illustrates another example user interface 2400 presenting a scenario builder screen according to certain embodiments of this disclosure. In the depicted scenario creator tool user interface 2400, various modules are presented, such as random event module, property state change module, update user interface module, alert module, and user action committed module. Additional modules may be included.

As depicted, the update user interface module is being configured in the user interface 2400. A random event module instance is linked to the update user interface module. The random event module instance includes the same configurations as described with regards to the user interface 2300. In the user interface 2400, an update user interface module instance is linked to each configuration. For example, for the "AFB 1 Lost" configuration, the update user interface module instance indicates that the user interface for the role A4 is updated to remove the AFB 1 from the asset list (e.g., according to the property state change module instance). For the "AFB 2 Lost" configuration, the update user interface module instance indicates that the user interface for the role A4 is updated to remove the AFB 2 form the asset list for 4 turns (e.g., according to property state change module instance).

FIG. 25A illustrates an example user interface 2500 for a scenario review screen according to certain embodiments of this disclosure. The user interface 2500 includes the actions performed by a certain role (e.g., A4) during a particular turn (e.g., 4). The user interface 2500 depicts the aircraft (e.g., including their tail numbers) selected by the user at the turn and the annotations of the user why he or she selected the aircraft. For example, the first annotation indicates "Aircraft 94-7493 meets mission requirements, has qualified available pilot, and is to be flight-ready in the next 18 hours."

FIG. 25B illustrates an example user interface 2510 for an evaluation system screen according to certain embodiments of this disclosure. The user interface 2510 presents a first portion including a timeline of events and actions performed in turns by each of the roles of users participating in the military scenario. Currently, turn 5 has been selected in the list on the left side of the user interface 2510. Accordingly, the turn 5 "box" is highlighted in the timeline presented on the user interface 2510. Graphical elements (e.g., boxes) may be presented that each represent a role of user. For example, boxes are presented for A2, A3, A4, A6, and WC. The box representing A3 is selected in the portion including the timeline, and thus, a second portion of the user interface 2510 includes the action performed by A3 during turn 5. As depicted, each box may be associated with an indicator (e.g., color-coded) that presents a quality measurement of the action performed by the role at the turn. For example the indicator may be a color-coded icon that is red when the action was wrong and green when the action performed was the best possible action the user having the role could have performed at the turn.

By presenting the various indicators for each role across each turn on the timeline, an enhanced user interface 2510 is provided that enables an evaluator to quickly determine which users are not performing well and need additional training. For example, if the indicator for a role of a user indicates the user consistently makes the wrong decision or action, the evaluator can determine that the user needs additional training and is not ready to be certified. Providing the indicators for the entire scenario, as depicted, enables the evaluator to make a decision quickly without having to drill-down and view each action in detail. Thus, the user interface 2510 provides an enhanced user interface that may improve the user's experience using the computing device and provides a technical improvement to user interfaces. In some embodiments, the AI engine 130 may determine, based on the indicators, that the user needs additional training and may provide a notification or recommendation automatically to a computing device of an evaluator regarding the same.

In some embodiments, an evaluator may be the user, a student, or the team of users participating in the scenario. In some embodiments, the evaluation module enables review of the completed scenario during a debrief, such that the inputs from the AI engine 130 simulator, and the decisions/actions made by each participant and their reasoning (documented at the time they made the decision), all come together during the evaluation. Some benefits of using the evaluator module may include both individual and team training and certification, as well as learning from the debrief, and the ability to challenge doctrine and other guidance.

FIG. 26 illustrates an example user interface 2600 including various portions of information pertaining to a user's turn that is conveniently presented on a screen of a mobile device according to certain embodiments of this disclosure. The user interface 2600 is tailored for the role A4 and is provides specific information, as determined by the AI engine 130, pertaining to turn 3. The user interface 2600 presents the information organized into at least two vertical portions: portion 2602 and portion 2604. Portion 2602 provides a table of aircrafts that may be selected for a mission. The table may include rows associated with each aircraft. The table may provide various information, such as flying unit number, tail number, status, grid status, etc. The selection of a row representing an aircraft in the portion 2602 may cause the row to be highlighted and may further cause one of the graphical elements in the portion 2604 to be populated with the information (e.g., tail number) of the selected aircraft from the portion 2602. Accordingly, the user is provided with enhanced coordinated graphical elements that clearly and conveniently express information as a result of a single action. Such a technique may be beneficial on small screens, such as those used by mobile devices (e.g., smartphones). The user may select a graphical element in portion 2604 to annotate a reason why the user selected a particular aircraft. Once the user has performed the desired actions, the user may select the graphical element (button) labeled "COMMIT" to send the actions to the AI engine 130. The AI engine 130 may process the actions and determine a subsequent state for the military scenario based on the actions of role A4, as well as the actions from each of the other roles participating in the military scenario that submitted actions in this round. In some embodiments, the AI engine 130 may wait until all actions from all roles of users are submitted prior to determining the next state and/or user interfaces for subsequent turns for the roles.

FIG. 27 illustrates example operations of a method 2700 for training users in remote locations according to certain embodiments of this disclosure. The method 2700 may be performed by processing logic that may include hardware (circuitry, dedicated logic, etc.), software, or a combination of both. The method 2700 and/or each of their individual functions, subroutines, or operations may be performed by one or more processors of a computing device (e.g., any component (server 128, etc.) of cloud-based computing system 116, or the computing device 102, of FIG. 1) implementing the method 2700. The method 2700 may be implemented as computer instructions stored on a memory device and executable by the one or more processors. In certain implementations, the method 2700 may be performed by a single processing thread. Alternatively, the method 2700 may be performed by two or more processing threads, each thread implementing one or more individual functions, routines, subroutines, or operations of the methods.

At block 2702, the processing device may provide a user interface to a set of computing devices of a set of users. The set of computing devices may include desktop computers, laptop computers, mobile devices (e.g., smartphones), tablet computers, etc. The set of computing devices may be communicatively coupled to each other via the network 120 and may be engaged in a virtual shared session. The set of computing devices may communicate information (e.g., text, video, audio, etc.) to each other in real-time or near real-time during a military scenario.

The users may not be in the same location as each other due to certain circumstances (e.g., outbreak of infectious disease, located in different cities or states, etc.). That is, the users may be located distally from each other but may use the user interface to train together via a similar military scenario. The user interface may present a set of military scenarios from which to choose and a set of roles to play in the set of military scenarios. Each of the set of users may use the user interface to select a particular military scenario and a role. The roles may include logistics, intel, operations, communications, commander, and the like.

At block 2704, the processing device may receive a set of selections from the set of computing devices. A response (e.g., one or more) may be received from each computing device of the set of computing devices. The set of selections may include a selection of a military scenario and a role the user selects to play during the military scenario. In some embodiments, the roles presented to the users may be determined based on their rank in the military organization, and may be controlled based on permissions associated with the credentials with which the user logged into the scenario exercise platform.

At block 2706, the processing device may transmit, based on the selection of the military scenario and the role the user selects to play during the military scenario, a set of prompts in a first turn to the set of computing devices. Each of the set of prompts may be unique to the particular role of each of the set of users. That is, each of the users may be participating in the same military scenario in real-time or near real-time, but be presented with a unique user interface for the particular role each user is playing in the military scenario. The AI engine 130 may generate the user interfaces. Different inputs, prompts, actions, decisions, etc. may be presented in the unique user interface for the different roles of users. The set of prompts may include information pertaining to mission packets, targeting, reporting, aircrew briefing, weapons, airfields, generating aircrafts, maintenance operations, civil engineering, services, force projections, supplies, air mobility, communications, internet services, air traffic control, or some combination thereof. In some embodiments, the unique user interface may be presented on a screen of a mobile computing device, where the user interface is tailored for a role of the plurality of roles and includes information pertaining to a turn of the military scenario, and the information is arranged in a set of portions of the user interface including one or more graphical elements to enable selection of one or more actions and submittal of the one or more actions for the turn.

At block 2708, the processing device may receive, from the set of computing devices, a set of actions to perform in response to the set of prompts. The actions may include acknowledgements, responses, rejections, acceptances, searches, tracking orders, commands, attacks, and the like.

At block 2710, based on the set of actions, the processing device may modify, using the AI engine 130, the military scenario for a subsequent turn to cause a different set of prompts to be transmitted to the set of computing devices. In some embodiments, the processing device may generate, via the AI engine 130, one or more machine learning models 132 trained to modify the military scenario for the subsequent turn to cause the different plurality of prompts to be transmitted to the plurality of computing devices. In some embodiments, the AI engine 130 may include an expert system that includes rules and responses to the plurality of actions. The expert system may use the rules and responses to modify the military scenario for the subsequent turn to cause the different plurality of prompts to be transmitted to the set of computing devices.

In some embodiments, the processing device may receive, via a computing device of a user having a certain role (e.g., commander, A2, A3, A4, etc.), a decision that determines a second set of prompts to present to A-staff participating in the military scenario. The A-staff may represent the set of users participating in the military scenario. The processing device may transmit the second set of prompts to the set of computing devices of the A-staff.

In some embodiments, the processing device may, responsive to receiving the selection of the military scenario, transmit a visual tutorial to be presented on the set of computing devices. The visual tutorial may present an explanation of the military scenario, available resources, initial objectives, or some combination thereof.

In some embodiments, the user interface may enable a person having a certain role (e.g., commander, administrator) to design the military scenario. In some embodiments, any user may be enabled to create a scenario using the user interface. The user interface may enable drag-and-drop operations, selection operations, text input, mouse cursor operations, or the like to configure the military scenario. Configuration options may include any suitable military scenario configuration, such as site location, aircraft selection, available resources, adversaries, targets, events, available actions, communication options, number of players, types of roles involved, objectives, completion goals, etc. In one example, the design decision may include an event that occurs during the military scenario and an outcome based on a response to the event. The outcome may have a butterfly effect where other events are triggered to occur in the military scenario based on the outcome. Accordingly, each user in the military scenario may impact the next events that are generated based on their decisions during the military scenario.

In some embodiments, the processing device may stream real-time data to the computing devices. The real-time data may cause the military scenario to update while the military scenario is active. For example, a weather update (e.g., from a weather service) for a location where the military scenario is taking place may be received by the processing device in real-time and the processing device may cause the weather update to be implemented in the military scenario on the computing devices. Based on the weather update, different events and/or prompts may be presented on the computing devices. For example, if the weather update includes a severe thunderstorm, the commander may see the weather update and command the other A-staff to return to base until the storm passes.

In some embodiments, responsive to completion of the military scenario, the processing device may transmit a debrief message to each of the set of computing devices. In some embodiments, the debrief may be executed by the scenario exercise platform as a virtual meeting that occurs right after the scenario is completed when participants review the outcome. The debrief message may be audio, audiovisual, text, or some combination thereof. The debrief message may be presented on the computing devices of the users and may present any suitable information, such as military scenario results, individual results, a grade for each user, adversary information, target information, aircraft status, aircraft information, suggestions to improve results, or the like.

FIG. 28 illustrates an example computer system 2800, which can perform any one or more of the methods described herein. In one example, computer system 2800 may correspond to the computing device 102 or the one or more servers 128 of the cloud-based computing system 116 of FIG. 1. The computer system 2800 may be capable of executing the application 107 (e.g., scenario exercise platform) of FIG. 1. The computer system 2800 may be connected (e.g., networked) to other computer systems in a LAN, an intranet, an extranet, or the Internet. The computer system 2800 may operate in the capacity of a server in a client-server network environment. The computer system 2800 may be a personal computer (PC), a tablet computer, a laptop, a wearable (e.g., wristband), a set-top box (STB), a personal Digital Assistant (PDA), a smartphone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 2800 includes a processing device 2802, a main memory 2804 (e.g., read-only memory (ROM), solid state drive (SSD), flash memory, dynamic random access memory (DRAM) such as synchronous DRAM (SDRAM)), a static memory 2806 (e.g., solid state drive (SSD), flash memory, static random access memory (SRAM)), and a data storage device 2808, which communicate with each other via a bus 2810.

Processing device 2802 represents one or more general-purpose processing devices such as a microprocessor, central processing unit, or the like. More particularly, the processing device 2802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2802 may also be one or more special-purpose processing devices such as an application specific integrated circuit (ASIC), a field programmable gate array (FPGA), a digital signal processor (DSP), network processor, or the like. The processing device 2802 is configured to execute instructions for performing any of the operations and steps discussed herein.

The computer system 2800 may further include a network interface device 2812. The computer system 2800 also may include a video display 2814 (e.g., a liquid crystal display (LCD) or a cathode ray tube (CRT)), one or more input devices 2816 (e.g., a keyboard and/or a mouse), and one or more speakers 2818 (e.g., a speaker). In one illustrative example, the video display 2814 and the input device(s) 2816 may be combined into a single component or device (e.g., an LCD touch screen).

The data storage device 2816 may include a computer-readable medium 2820 on which the instructions 2822 (e.g., implementing the application 107, and/or any component depicted in the FIGURES and described herein) embodying any one or more of the methodologies or functions described herein are stored. The instructions 2822 may also reside, completely or at least partially, within the main memory 2804 and/or within the processing device 2802 during execution thereof by the computer system 2800. As such, the main memory 2804 and the processing device 2802 also constitute computer-readable media. The instructions 2822 may further be transmitted or received over a network via the network interface device 2812.

While the computer-readable storage medium 2820 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The invention claimed is:

1. A method for training a plurality of users comprising:

providing a user interface to a plurality of computing devices of the plurality of users, wherein the user interface presents a plurality of scenarios and a plurality of roles to play in the plurality of scenarios;

receiving a plurality of selections from the plurality of computing devices, wherein the plurality of selections comprise a selection of a scenario and a role a user selects to play during the scenario;

transmitting, based on the selection of the scenario and the role the user selects to play during the scenario, a plurality of prompts in a first turn of the scenario to the plurality of computing devices, wherein each of the plurality of prompts is unique to a respective particular role of each of the plurality of users, wherein a subsequent turn of the scenario begins after completion of the first turn by the plurality of users;

receiving, from the plurality of computing devices, a plurality of actions to perform in response to the plurality of prompts; and based on the plurality of actions, modifying, using an artificial intelligence engine, the scenario for the subsequent turn to cause a different plurality of prompts to be transmitted to the plurality of computing devices, wherein the artificial intelligence engine is trained to dynamically update user interfaces of the plurality of computing devices for the plurality of users having specific roles and for specific turns of the scenario based on the plurality of actions performed by the plurality of users having the respective particular role in the first turn of the scenario, and wherein at least a first user interface of the plurality of computing devices is dynamically updated by the artificial intelligence engine based on a first user input received from a first computing device of the plurality of computing devices during the first turn of the scenario.

2. The method of claim 1, further comprising:

receiving, via a computing device of a commander, a decision that determines a second plurality of prompts to present to A-staff participating in the scenario, wherein the A-staff represent the plurality of users; and transmitting the second plurality of prompts to the plurality of computing devices of the A-staff.

3. The method of claim 1, further comprising, responsive to receiving the selection of the scenario, transmitting a visual tutorial to be presented on the plurality of computing devices, wherein the visual tutorial presents an explanation of the scenario, available resources, adversaries, initial objectives, or some combination thereof.

4. The method of claim 1, further comprising:

receiving, via a drag-and-drop operation on a user interface presented on one of the plurality of computing devices, a design decision for the scenario for each role of the plurality of roles.

5. The method of claim 4, wherein the design decision comprises an event that occurs during the scenario and an outcome based on a response to the event.

6. The method of claim 1, wherein the plurality of prompts comprises information pertaining to mission packets, targeting, reporting, aircrew briefing, weapons, airfields, generating aircrafts, maintenance operations, civil engineering, services, force projections, supplies, air mobility, communications, internet services, air traffic control, or some combination thereof.

7. The method of claim 1, wherein the plurality of computing devices are engaged in a virtual shared session via a network, wherein the virtual shared session represents the scenario.

8. The method of claim 1, further comprising streaming real-time data to the computing devices, wherein the real-time data causes the scenario to update while the scenario is active.

9. The method of claim 1, further comprising, responsive to completion of the scenario, transmitting a debrief message to each of the plurality of computing devices.

10. The method of claim 1, further comprising:

generating, via the artificial intelligence engine, one or more machine learning models trained to modify the scenario for the subsequent turn to cause the different plurality of prompts to be transmitted to the plurality of computing devices.

11. The method of claim 1, wherein the artificial intelligence engine comprises an expert system that includes rules and responses to the plurality of actions, wherein the expert system uses the rules and responses to modify the scenario for the subsequent turn to cause the different plurality of prompts to be transmitted to the plurality of computing devices.

12. The method of claim 1, further comprising:

presenting the user interface on a screen of a mobile computing device, wherein the user interface is tailored for a role of the plurality of roles and includes information pertaining to a turn of the scenario, and the information is arranged in a plurality of portions of the user interface including one or more graphical elements to enable selection of one or more actions and submittal of the one or more actions for the turn.

13. A tangible, non-transitory computer-readable medium storing instructions that, when executed, cause a processing device to:

provide a user interface to a plurality of computing devices of a plurality of users, wherein the user interface presents a plurality of scenarios and a plurality of roles to play in the plurality of scenarios;

receive a plurality of selections from the plurality of computing devices, wherein the plurality of selections comprise a selection of a scenario and a role a user selects to play during the scenario;

transmit, based on the selection of the scenario and the role the user selects to play during the scenario, a plurality of prompts in a first turn of the scenario to the plurality of computing devices, wherein each of the plurality of prompts is unique to a respective particular role of each of the plurality of users, wherein a subsequent turn of the scenario begins after completion of the first turn by the plurality of users;

receive, from the plurality of computing devices, a plurality of actions to perform in response to the plurality of prompts; and based on the plurality of actions, modify, using an artificial intelligence engine, the scenario for the subsequent turn to cause a different plurality of prompts to be transmitted to the plurality of computing devices, wherein the artificial intelligence engine is trained to dynamically update user interfaces of the plurality of computing devices for the plurality of users having specific roles and for specific turns of the scenario based on the plurality of actions performed by the plurality of users having the respective particular role in the first turn of the scenario, and wherein at least a first user interface of the plurality of computing devices is dynamically updated by the artificial intelligence engine based on a first user input received from a first computing device of the plurality of computing devices during the first turn of the scenario.

14. The computer-readable medium of claim 13, wherein the instructions that, when executed, further cause the processing device to:

generate, via the artificial intelligence engine, one or more machine learning models trained to modify the scenario for the subsequent turn to cause the different plurality of prompts to be transmitted to the plurality of computing devices.

15. The computer-readable medium of claim 13, wherein the artificial intelligence engine comprises an expert system that includes rules and responses to the plurality of actions, wherein, based on the plurality of actions, the expert system uses the rules and responses to modify the scenario for the subsequent turn to cause the different plurality of prompts to be transmitted to the plurality of computing devices.

16. The computer-readable medium of claim 13, wherein the instructions that, when executed, further cause the processing device to:

present the user interface on a screen of a mobile computing device, wherein the user interface is tailored for a role of the plurality of roles and includes information pertaining to a turn of the scenario, and the information is arranged in a plurality of portions of the user interface including one or more graphical elements to enable selection of one or more actions and submittal of the one or more actions for the turn.

17. The computer-readable medium of claim 13, wherein the instructions that, when executed, further cause the processing device to:

receive, via a computing device of a commander, a decision that determines a second plurality of prompts to present to A-staff participating in the scenario, wherein the A-staff represent the plurality of users; and transmit the second plurality of prompts to the plurality of computing devices of the A-staff.

18. The computer-readable medium of claim 13, wherein the instructions that, when executed, further cause the processing device to:

responsive to receiving the selection of the scenario, transmit a visual tutorial to be presented on the plurality of computing devices, wherein the visual tutorial presents an explanation of the scenario, available resources, adversaries, initial objectives, or some combination thereof.

19. The computer-readable medium of claim 13, wherein the instructions that, when executed, further cause the processing device to:

receive, via a drag-and-drop operation on a user interface presented on one of the plurality of computing devices, a design decision for the scenario for each role of the plurality of roles.

20. A system comprising:

a memory device storing instructions;

a processing device communicatively coupled to the memory device, wherein the processing device executes the instructions to:

provide a user interface to a plurality of computing devices of a plurality of users, wherein the user interface presents a plurality of scenarios and a plurality of roles to play in the plurality of scenarios;

receive a plurality of selections from the plurality of computing devices, wherein the plurality of selections comprise a selection of a scenario and a role a user selects to play during the scenario;

transmit, based on the selection of the scenario and the role the user selects to play during the scenario, a plurality of prompts in a first turn of the scenario to the plurality of computing devices, wherein each of the plurality of prompts is unique to a respective particular role of each of the plurality of users;

receive, from the plurality of computing devices, a plurality of actions to perform in response to the plurality of prompts; and based on the plurality of actions, modify, using an artificial intelligence engine, the scenario for a subsequent turn to cause a different plurality of prompts to be transmitted to the plurality of computing devices, wherein the artificial intelligence engine is trained to dynamically update user interfaces of the plurality of computing devices for the plurality of users having specific roles and for specific turns of the scenario based on the plurality of actions performed by the plurality of users having the respective particular role in the first turn of the scenario, and wherein at least a first user interface of the plurality of computing devices is dynamically updated by the artificial intelligence engine based on a first user input received from a first computing device of the plurality of computing devices during the first turn of the scenario.

* * * * *